(12) United States Patent
Futa et al.

(10) Patent No.: US 8,510,608 B2
(45) Date of Patent: Aug. 13, 2013

(54) GENERATING PUF ERROR CORRECTING CODE USING REDUNDANT HARDWARE

(75) Inventors: Yuichi Futa, Osaka (JP); Kaoru Yokota, Hyogo (JP); Masao Nonaka, Osaka (JP); Manabu Maeda, Osaka (JP); Natsume Matsuzaki, Osaka (JP)

(73) Assignee: Panasonic Corporation, Osaka (JP)

( * ) Notice: Subject to any disclaimer, the term of this patent is extended or adjusted under 35 U.S.C. 154(b) by 531 days.

(21) Appl. No.: 12/443,736

(22) PCT Filed: Nov. 2, 2007

(86) PCT No.: PCT/JP2007/071413
§ 371 (c)(1),
(2), (4) Date: Apr. 8, 2009

(87) PCT Pub. No.: WO2008/056612
PCT Pub. Date: May 15, 2008

(65) Prior Publication Data
US 2010/0031065 A1   Feb. 4, 2010

(30) Foreign Application Priority Data

Nov. 6, 2006   (JP) ................................. 2006-299905
Nov. 6, 2006   (JP) ................................. 2006-299906

(51) Int. Cl.
*G06F 11/08*   (2006.01)
*G06F 11/16*   (2006.01)

(52) U.S. Cl.
USPC ............... 714/52; 708/251; 713/194; 714/25; 714/48

(58) Field of Classification Search
CPC ....................................................... G06F 11/16
USPC ................. 708/250, 251; 713/194; 714/777
See application file for complete search history.

(56) References Cited

U.S. PATENT DOCUMENTS 5,274,799 A * 12/1993 Brant et al. .................. 714/6.12
5,961,577 A * 10/1999 Soenen et al. ................ 708/251
(Continued)

FOREIGN PATENT DOCUMENTS

EP   1 501 236   1/2005
JP   2000-83019   3/2000
(Continued)

OTHER PUBLICATIONS

International Search Report issued Jan. 15, 2008 in the International (PCT) Application of which the present application is the U.S. National Stage.

(Continued)

*Primary Examiner* — Techane Gergiso
*Assistant Examiner* — Ngoc D Nguyen
(74) *Attorney, Agent, or Firm* — Wenderoth, Lind & Ponack, L.L.P.

(57) ABSTRACT

Provided is an information security apparatus that has enhanced stability and confidentiality of a hash key. The information security apparatus includes an information generating PUF unit that has tamper resistance set, using physical characteristics, so as to output a preset hash key, a partial error-correction information storage unit that stores partial error-correction information, an error correcting PUF unit that has tamper-resistance set, using physical characteristics, so as to output error-correcting PUF information, an error-correction information generating unit that generates error-correction information using partial correction information and the error-correcting PUF information, and an error correcting unit that corrects an error for the hash key outputted from the information generating PUF unit and outputs an error-corrected hash key.

15 Claims, 22 Drawing Sheets

(56) References Cited

U.S. PATENT DOCUMENTS

| | | | |
|---|---|---|---|
| 6,161,213 A | 12/2000 | Lofstrom | |
| 6,246,970 B1* | 6/2001 | Silverbrook et al. | 702/117 |
| 7,268,685 B2 | 9/2007 | Kwon et al. | |
| 7,690,024 B2 | 3/2010 | Kinoshita et al. | |
| 2002/0188857 A1 | 12/2002 | Orlando et al. | |
| 2003/0204743 A1* | 10/2003 | Devadas et al. | 713/200 |
| 2004/0053429 A1 | 3/2004 | Muranaka | |
| 2005/0149514 A1* | 7/2005 | Tsuzuki et al. | 707/3 |
| 2005/0270153 A1 | 12/2005 | Kwon et al. | |
| 2006/0050580 A1 | 3/2006 | Yamaguchi et al. | |
| 2006/0212709 A1 | 9/2006 | Kinoshita et al. | |
| 2007/0044139 A1 | 2/2007 | Tuyls et al. | |
| 2008/0183788 A1* | 7/2008 | Song et al. | 708/251 |
| 2008/0260152 A1* | 10/2008 | Skoric et al. | 380/258 |
| 2010/0122093 A1* | 5/2010 | Tuyls et al. | 713/180 |

FOREIGN PATENT DOCUMENTS

| | | |
|---|---|---|
| JP | 2002-537646 | 11/2002 |
| JP | 2003-051820 | 2/2003 |
| JP | 2005-45760 | 2/2005 |
| JP | 2005-523481 | 8/2005 |
| JP | 2005-353066 | 12/2005 |
| JP | 2006-60109 | 3/2006 |
| JP | 2006-221361 | 8/2006 |
| WO | 02/45139 | 6/2002 |
| WO | 2004/104899 | 12/2004 |

OTHER PUBLICATIONS

Jae W. Lee et al., "*A Technique to Build a Secret Key in Integrated Circuits for Identification and Authentication Applications*", 2004 Symposium on VLSI Circuits Digest of Technical Papers, p. 176-179, Jun. 2004.

D.C. Ranasinghe et al., "*An Integrable Low Cost Hardware Random Number Generator*", Proceedings of SPIE—The International Society for Optical Engineering, vol. 5649, Part Two of Two Parts, p. 627-639, Dec. 2004.

\* cited by examiner

FIG. 11

| Temperature (Environmental information) | Output values of nine first PUF circuits | Output values of nine second PUF circuits |
|---|---|---|
| 0°C | (100 000 111) | (365 156 137) |
| 10°C | (101 000 110) | (265 157 237) |
| 20°C | (101 000 110) | (275 067 337) |

GENERATING PUF ERROR CORRECTING CODE USING REDUNDANT HARDWARE

TECHNICAL FIELD

The present invention relates to a system that performs authentication or encryption and, more specifically, an information security apparatus that securely implements secret data such as a key to be used for an encryption process or unique ID data of devices with protection against analysis.

BACKGROUND ART

In recent years, more and more consumer appliances perform encryption processes for the purpose of copyright protection of digital content or secret data communications over networks. In such encryption processes, keys and ID data to be used in the processes need to be stored in appliances to use them. Safety of copyright protection systems and secure communication systems largely depend on confidentiality of the keys and the ID data. It is therefore necessary that such secret data is securely stored with protection against external analysis.

Conventional, typical methods for securely storing secret data include a method for storing data in a high-tamper-resistant hardware chip (tamper-resistant chip) and a method for embedding data in tamper-proof software. However, the former method has a problem that a special dedicated chip necessary for achieving high confidentiality for secret data is too costly. The latter method, on the other hand, generally cannot achieve such a high confidentiality that leaves little possibility of reveal of secret data through a long-time analysis.

Physically Unclonable Function (PUF) is a technique that can achieve high confidentiality of secret data without any special hardware such as a tamper-resistant chip. The PUF provides a method for storing secret data resistant to physical analysis by utilizing physical characteristics of devices. There are several specific methods for implementing the PUF. A silicon PUF disclosed in Patent Reference 1 is especially suitable for consumer appliances that are required to be less costly because the silicon PUF does not need special manufacturing environment or facilities to achieve high tamper resistance at less manufacturing cost.

(Overview of Silicon PUFs)

FIG. 1 shows a circuit configuration that implements a conventional silicon PUF. A PUF circuit 2000 shown in FIG. 1 is a circuit that outputs one-bit secret data when receiving a trigger signal.

The PUF circuit 2000 includes eight ring oscillators (a first ring oscillator 2001 to an eighth ring oscillator 2008), ring oscillator selecting units (a first ring oscillator selecting unit 2011 and a second ring oscillator selecting unit 2012) that each select one of the eight ring oscillators on the basis of input data, frequency counting units (a first frequency counting unit 2021 and a second frequency counting unit 2022) that count oscillation frequencies from the ring oscillators selected by the ring oscillator selecting units, and an output bit determining unit 2030 that determines an output bit of the PUF circuit 2000 on the basis of the counted frequencies. An operation of the PUF circuit 2000 is described below.

First, the ring oscillator selecting units 2011 and 2012 each select a predetermined ring oscillator from the eight ring oscillators 2001 to 2008. Next, the ring oscillators 2001 to 2008 receive a trigger signal to start oscillation operation. The frequency counting units 2021 and 2022 measure output signals from the ring oscillators selected by the ring oscillator selecting units 2011 and 2012 for oscillation frequencies of the ring oscillators, respectively. The output bit determining unit 2030 compares the two measured oscillation frequencies and determines an output bit of the PUF circuit 2000 on the basis of the magnitude ordering of the oscillation frequencies.

A trigger signal inputted into the PUF circuit 2000 causes the PUF circuit 2000 to determine only a one-bit output bit internally and output the output bit through the operation above. Even with the same configuration, such as the number of stages, the eight ring oscillators 2001 to 2008 have physical characteristics, such as delay, that are slightly different among them due to variations in a manufacturing process. Because of this, oscillation frequencies of the ring oscillators slightly differ from one another. The difference of the oscillation frequencies is determined unpredictably through manufacture of PUF circuits, and each of the PUF circuits has a unique oscillation frequency. Such oscillation frequencies make output bits mutually different. Correspondence between input data and output bits can be analyzed by measuring oscillation frequencies of ring oscillators in a PUF circuit. However, it is difficult to externally analyze the correspondence between input data and output bits of a PUF circuit because external analysis operation, such as probing, on the basis of oscillation frequencies affects physical characteristics of the ring oscillators, thereby preventing measuring the same oscillation frequencies as when output bits are calculated. Furthermore, PUF circuits can be manufactured less costly in environment and facilities for usual LSIs because they are fabricated as combinational circuits of ring oscillators, frequency counters and comparators without requiring special manufacturing environment or facilities.

(Problem of Silicon PUFs)

As described above, the silicon PUF technology enables low cost implementation of functions with input-output relations that are different from chip to chip and difficult to be analyzed. However, there are the following problems with silicon PUFs. Output bits of PUF circuit are determined by the magnitude ordering of oscillation frequencies of ring oscillators selected on the basis of input data. As mentioned above, differences in physical characteristics, such as delay, due to manufacturing variation cause differences in oscillation frequencies among ring oscillators. However, the magnitude ordering of two ring oscillators may be reversed due to environment change around them, such as temperature change, when the frequencies of the two ring oscillators are close together. For example, where two ring oscillators A and B are selected on the basis of an input data, and oscillation frequencies from them measures 1256 Hz and 1245 Hz, respectively, [the oscillation frequency of A]>[the oscillation frequency of B]; thus, the value of an output bit is determined as "1". When the identical input data is inputted into the PUF circuit at a different time, the same ring oscillators A and B are selected. If temperature around the ring oscillators is higher in this case than the case before, delays in the ring oscillators increase, so that the oscillation frequencies decrease. However, since the oscillation frequencies decrease slightly differently between the two ring oscillators, the magnitude ordering may be reversed when original frequencies of the ring oscillators are close together. In this example, where the frequencies of the ring oscillators A and B differ only by 9 Hz, the magnitude ordering that [the oscillation frequency of A]>[the oscillation frequency of B] may be reversed due to temperature change. In other words, different output bits may be outputted for identical input data in some times, resulting in a problem with stability of values of output bits.

(Improvement of Silicon PUFs)

In order to address this problem, error-correction codes have been used in a conventional technique so as to increase stability by correcting output values (values of output bits) for errors.

FIG. 2 shows a configuration of an information security apparatus 3000 according to a conventional technique. The information security apparatus 3000 outputs a keyed hash value with a key generated using a PUF, for input data that has been externally inputted. The keyed hash value is generated using a keyed hash function. The keyed hash function is described on pages 189 to 195 of Non-patent Reference 1.

The information security apparatus 3000 includes an input unit 3001 that receives external input data, an output unit 3002 that outputs a keyed hash value, a hash generating unit 3003 that generates the keyed hash value, a PUF unit 3004 that generates a key using a PUF, error correcting unit 3005 that corrects the key for errors according to error-correction information and generates a hash key, and an error-correction information storage unit 3006 that stores the error-correction information.

The PUF unit 3004 includes a plurality of PUF circuits, for example, six PUF circuits 2000 and concatenates output bits from the PUF circuits to generate a six-bit key.

Operation of the information security apparatus 3000 is described below. The input unit 3001 receives external data and transmits a trigger signal to the PUF circuits 2000 in the PUF unit 3004. The PUF circuits 2000 generates output bits, and the PUF unit 3004 concatenates the output bits from the six PUF circuits 2000 to generate a key. Next, the error correcting unit 3005 corrects the key according to the error-correction information and generates a corrected hash key. Then, the hash generating unit 3003 generates a keyed hash value of the input data using the corrected hash key, and the output unit 3002 outputs the keyed hash value.

The error-correction information is determined by measuring values from the PUF circuits 2000 in the PUF unit 3004 when the information security apparatus 3000 is manufactured. More specifically, a plurality of keys generated by the PUF unit 3004 are surveyed to determine the most frequent key value, and then error-correction information is determined for the most frequent key value and stored in the error-correction information storage unit 3006.

Patent Reference 1: US 2003/0204743

Non-patent Reference 1: Tatsuaki Okamoto and Hirosuke Yamamoto, "GENDAI ANGOH", Sangyo Tosho (1997)

Summary of the Invention

Problems that Invention is to Solve

However, there is a problem with the conventional technique that the key value of the corrected hash key which is inputted from the error correcting unit 3005 to the hash generation unit 3003 may be easily identified by analyzing the error-correction information stored in memory (the error-correction information storage unit 3006).

Here is an example where an error correction is performed using a repetition code inserted every three bits. For the repetition code, Hamming weight of a three-bit string is calculated. The string is decoded into "0" when the Hamming weight is one or less, and "1" when it is two or more. For example, a string "011" is decoded into "1". The PUF unit 3004 outputs a six-bit string, and the string is divided into three two-bit strings. The error-correction information is a three-bit string obtained by combining three single bits each from three respective three-bit repetition codes. In this example, it is assumed that the most frequent output value is determined as "11 00 01" by surveying output values from the PUF unit 3004 in the manufacturing of the information security apparatus 3000. The error-correction information is assumed to be "X Y Z", where X, Y, and Z is 0 or 1. In this case, the first code is "11X", and this is decoded into "1". The "X" is set to 1 so as to decode the first code properly even in the case of an error. Similarly, the "Y" is set to 0. The "Z" may be set to either 0 or 1. Here, it is assumed that the Z is set to "1". Accordingly, the error-correction information is "1 0 1", and a decoded value, that is, a corrected hash key is "1 0 1". The error-correction information is identical to the corrected hash key; thus, an attacker can find out the corrected hash key by analyzing the error-correction information.

The above is an extreme case, but there is still a possibility that an attacker can easily obtain a key value of a corrected hash key using error-correction information even when a method for error correction or setting for error-correction information is otherwise. An attacker who has obtained the key value will store it in memory and create a PUF simulator to be used with a keyed hash function. The attacker will be then able to forge a keyed hash value and endangers confidentiality.

This is the problem of insufficient safety of a PUF with a conventional technique.

The present invention, conceived to address the problem, has an object of providing an information security apparatus that maintains safety of a PUF even when an attacker analyzes information stored in memory, that is, an information security apparatus with enhanced safety and confidentiality of secret data.

Means to Solve the Problems

In order to achieve the above-mentioned object, the information security apparatus according to the present invention that outputs preset secret data includes: a first tamper-resistant circuit having tamper resistance and set, using physical characteristics, so as to output predetermined secret data; a correction data storage unit configured to store first correction data; a second tamper-resistant circuit having tamper resistance and set, using physical characteristics, so as to output second correction data; a correction information generating unit configured to generate error-correction information using the first correction data and the second correction data, the first correction data stored in the correction data storage unit and the second correction data outputted from the second tamper-resistant circuit; and an error correcting unit configured to perform an error correction, using the error-correction information generated by the correction information generating unit, on secret data outputted from the first tamper-resistant circuit, and to output the error-corrected secret data. For example, the secret data preset for the first tamper-resistant circuit and the second correction data preset for the second tamper-resistant circuit are set using a Physically Unclonable Function (PUF).

Unlike in the conventional technique, error-correction information to be used as it is for error correction of secret data is not stored in memory but generated using the second tamper-resistant circuit. Due to this, attackers have difficulty in finding the error-correction information, so that safety and confidentiality of the secret data set in the first tamper-resistant circuit is enhanced. The present invention also enhances stability of the secret data by correcting an error due to a change in environment, such as ambient temperature, or a change with aging for the secret data outputted from the first tamper-resistant circuit using the error-correction information.

Furthermore, the information security apparatus may further include a receiving unit configured to receive input data; and an encrypting unit configured to encrypt the input data using the secret data outputted from the error correcting unit as a key.

For example, the input data is converted into a keyed hash value or a cryptograph. This enhances safety of the keyed hash value and the cryptograph.

Furthermore, the first tamper-resistant circuit may include at least one first PUF circuit that outputs a one-bit value as at least a part of the secret data, and the second tamper-resistant circuit may include at least one second PUF circuit that outputs a value of at least two bits as at least a part of the second correction data.

For example, when the second PUF circuit outputs a value of one bit only, an error may occur in the value due to a noise. In contrast, since the second PUF circuit according to the present invention outputs values of two or more bits, an error in any of the bits can be easily corrected. This enhances noise-resistance of the second correction data outputted from the second tamper-resistant circuit.

Furthermore, the first tamper-resistant circuit may include at least one first PUF circuit that includes: N oscillation units each configured to output an oscillation signal, where $N \geq 2$; a selecting unit configured to select M oscillation units from the N oscillation units, where $M \leq N$; and a determining unit configured to determine an output value according to magnitude ordering of frequencies of oscillation signals outputted from the M oscillation units selected by the selecting unit, and to output the determined output value, wherein the selecting unit is configured to select the M oscillation units so that the output value determined by the determining unit indicates at least a part of the preset secret data. More specifically, the selecting unit selects the M oscillation units so that a difference between frequencies of oscillation signals outputted from the M oscillation units is equal to or greater than a first threshold.

For example, when a difference between frequencies of oscillation signals outputted from two selected oscillation units is so small, the magnitude ordering between the frequencies may be reversed due to change in physical characteristics of the oscillation units with age. In contrast, according to the present invention, since the M oscillation units are selected so that the difference between the frequencies is equal to or greater than the first threshold, the magnitude ordering of the frequencies from these oscillation units may be prevented from being reversed even when the physical characteristics of the oscillation units change with age. Consequently, occurrence of errors in secret data outputted from the first tamper-resistant circuit may be reduced.

Furthermore, the information security apparatus may further include: an error determining unit configured to determine whether or not an error has occurred in the secret data outputted from the first tamper-resistant circuit by comparing the error-corrected secret data outputted from the error correcting unit and the secret data outputted from the first tamper-resistant circuit; and a reset requesting unit configured to request the first tamper-resistant circuit to reset the preset secret data when the error-determining unit determines that the error has occurred, wherein the first PUF circuit further includes a resetting unit configured to reset the preset secret data by causing the selecting unit to make the selection again when the first tamper-resistant circuit is requested to reset by the reset requesting unit.

This increases accuracy of error correction and further enhances the stability of the secret data by resetting the preset secret data in the first tamper-resistant circuit when an error has occurred in the secret data outputted from the first tamper-resistant circuit.

Furthermore, the first PUF circuit may further include: a secret data storage unit for storing at least a part of the preset secret data; a storage processing unit configured to store at least the part of the preset secret data in the secret data storage unit in the case where the selecting unit fails to select the M oscillation units so that the difference of the oscillation frequencies is equal to or greater than the first threshold during the selecting of the M oscillation units; and an output controlling unit configured to prevent the determining unit from determining the output value, and to output at least the part of the secret data stored in the secret data storage unit when the secret data storage unit stores at least the part of the secret data.

Errors are more likely to occur in output values from the first PUF circuit when the differences between frequencies of oscillation signals outputted from any set of the M oscillation units selected from the N oscillation units are smaller than the first threshold. This will result in decreased reliability of the output values. In such a case, according to the present invention, the secret data storage unit stores at least a part of the preset secret data that is to be outputted by the first PUF circuit, so that probability of errors in the secret data outputted from the first tamper-resistant circuit is reduced, and reliability is enhanced.

Furthermore, the first tamper-resistant circuit may include: a plurality of the first PUF circuits; and a concatenating unit configured to generate secret data by concatenating output values outputted from the plurality of first PUF circuits, wherein, when the error-determining unit determines that an error has occurred in the secret data outputted from the first tamper-resistant circuit, the error-determining unit is further configured to identify a first PUF circuit that outputs an output value including the error among the plurality of the first PUF circuits, the reset requesting unit is configured to request the first PUF circuit identified as the PUF circuit outputting the output value having the error to reset the output value so that the output value indicates the part of the preset secret data.

This allows identifying a first PUF circuit that outputs an output value having an error and resetting the output value of the identified first PUF circuit, so that the preset secret data can be properly reset for the first tamper-resistant circuit.

Furthermore, the information security apparatus may further include an error-determining unit configured to determine whether or not an error has occurred in pre-error-correction secret data by comparing the error-corrected secret data and the pre-error-correction secret data, the error-corrected secret data outputted from the error correcting unit and the pre-error-correction secret data outputted from the first tamper-resistant circuit; and a reset requesting unit configured to request the first tamper-resistant circuit to reset the preset secret data when the error determining unit determines that the error has occurred, wherein the first PUF circuit further includes: a secret data storage unit configured to store at least a part of the preset secret data; a storage processing unit for storing at least a part of the secret data in the secret data storage unit when the first tamper-resistant circuit is requested to reset by the reset requesting unit; and an output controlling unit configured to prevent the determining unit from determining the output value and output at least the part of the secret data stored in the secret data storage unit the secret data storage unit stores at least the part of the secret data.

A first PUF circuit that has output an erroneous output value even once is uncertain in terms of credibility. In such a case, according to the present invention, the secret data storage unit stores at least a part of the preset secret data that is to be outputted by the first PUF circuit, and the part of the preset secret data is outputted, so that occurrence of errors in the secret data outputted from the first tamper-resistant circuit is reduced and reliability is enhanced.

Furthermore, the first PUF circuit may further include a difference determining unit configured to determine whether or not a difference between frequencies of oscillation signals outputted from said M oscillation units is smaller than a second threshold; and a resetting unit configured to reset the preset secret data by causing said selecting unit to make the selection again when said difference determining unit determines that the difference between the frequencies is smaller than the second threshold.

This prevents an error in the output value outputted from the first PUF circuit.

Furthermore, the first PUF circuit may further include a threshold storage unit configured to store at least either of the first and the second thresholds; and an updating unit configured to update at least either of the first and the second thresholds stored in said threshold storage unit.

This allows resetting the preset secret data at the right time.

Furthermore, in order to achieve the above-mentioned object, the data generating apparatus, which generates first correction data to correct an error in secret data, according to the present invention includes: a first counting unit configured to count an output value outputted from a first tamper-resistant circuit having tamper resistance and set, using physical characteristics, so as to output a preset secret data; a second counting unit configured to count an output value outputted from a second tamper-resistant circuit having tamper resistance and set, using physical characteristics, so as to output second correction data; a data generating unit configured to generate the first correction data based on the output values counted by the first and the second counting units; and a storage processing unit configured to store, in a storage medium, the first correction data generated by the data generating unit. For example, the data generating unit may include a first generating unit configured to generate error-correction information by calculating a difference between an output value counted by the first counting unit and a value indicated by the secret data and a second generating unit configured to generate the first correction data by calculating a difference between the output value counted by the second counting unit and the value indicated by the error-correction information.

This allows appropriate generation of the first correction data required for generating error-correction information using the second correction data.

It is noted that the present invention can be embodied not only as an information security apparatus or a data generating apparatus, but also as a process performed by such apparatuses, a program that causes a computer to execute the process, a storage medium that stores the program, or an integrated circuit.

Effects of the Invention

The information security apparatus according to the present invention has a great advantage that it protects secret data concealed using a PUF even from attackers who exploit information stored in memory. Furthermore, according to the present invention, an information security apparatus will be provided that produces an advantageous effect of increased stability of output bit values for change with age while maintaining a characteristic of conventional PUF circuits that they are produced at a low cost and allow secure data storage.

BRIEF DESCRIPTION OF DRAWINGS

FIG. 11 shows a distribution of the output values analyzed by an environmental change analyzing unit according to the first embodiment.

NUMERICAL REFERENCES

Figure 1:
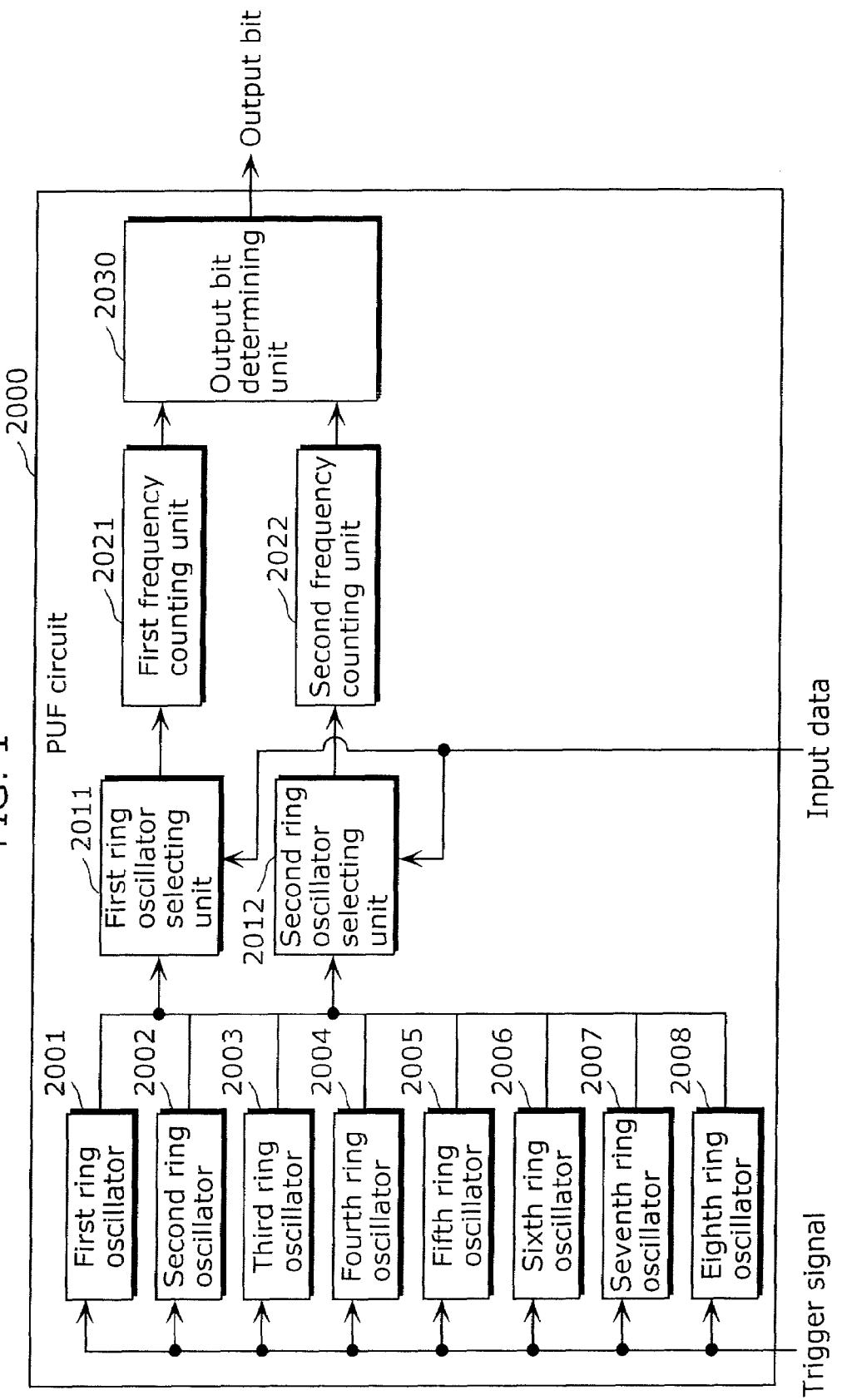
FIG. 1 shows a configuration of a conventional PUF circuit.
Figure 2:
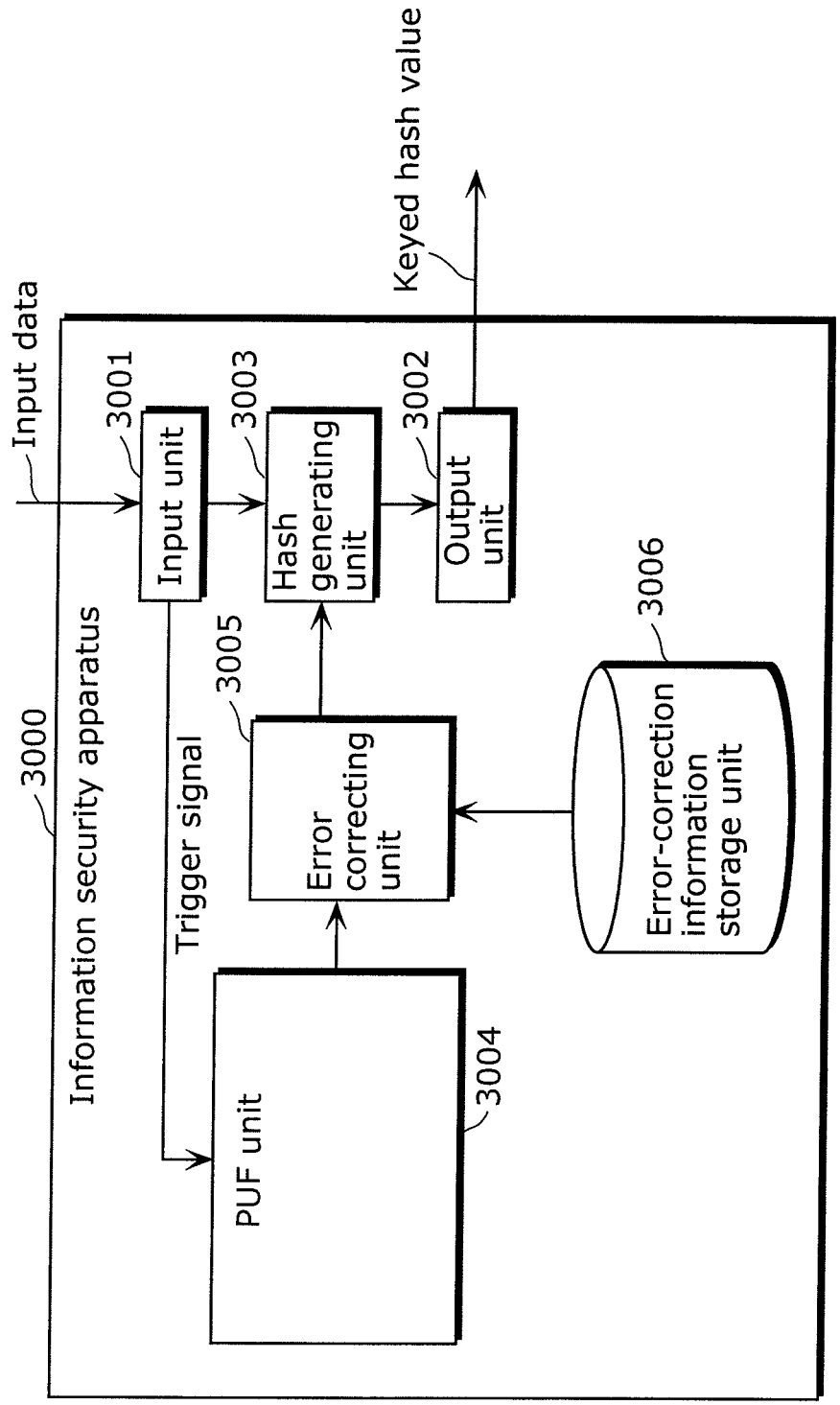
FIG. 2 shows a configuration of an information security apparatus that performs an error correction using a conventional PUF.

1 PUF circuit
13 Output bit determining unit

14 Input value storage unit
15 Input value setting unit
16 Input value reset determining unit
17 Threshold storage unit
18 Output bit control unit
19 Output bit storage unit
101 to 108 First to eighth ring oscillators
111, 112 First and second ring oscillator selecting units
121, 122 First and second frequency counting units
1000 Information security system
1100, 3000 Information security apparatus
1101, 3001 Input unit
1102, 3002 Output unit
1103, 3003 Hash generating unit
1104 Information generating PUF unit
11041A to 11041I First PUF circuit
11042 Hash key generating unit
1105, 3005 Error correcting unit
1106 Error correcting PUF unit
11061A to 11061I Second PUF circuit
11062 Error-correcting PUF information generating unit
1107 Partial error-correction information storage unit
1108 Error-correction information generating unit
1200 Error-correction information generating apparatus
1201 PUF circuit measuring unit
1202 Environment changing unit
1203 Environmental change analyzing unit
1204 Partial error-correction information generating unit
1205 Partial error-correction information setting unit
2000 PUF circuit
2001 First ring oscillator
2002 Second ring oscillator
2003 Third ring oscillator
2004 Fourth ring oscillator
2005 Fifth ring oscillator
2006 Sixth ring oscillator
2007 Seventh ring oscillator
2008 Eighth ring oscillator
2011 First ring oscillator selecting unit
2012 Second ring oscillator selecting unit
2021 First frequency counting unit
2022 Second frequency counting unit
2030 Output bit determining unit
3004 PUF unit
3006 Error-correction information storage unit

DETAILED DESCRIPTION OF THE INVENTION

Hereinafter, an embodiment of the present invention is described with reference to figures.

(First Embodiment)

An information security system 1000 is described as a first embodiment according to the present invention below.

Figure 3:
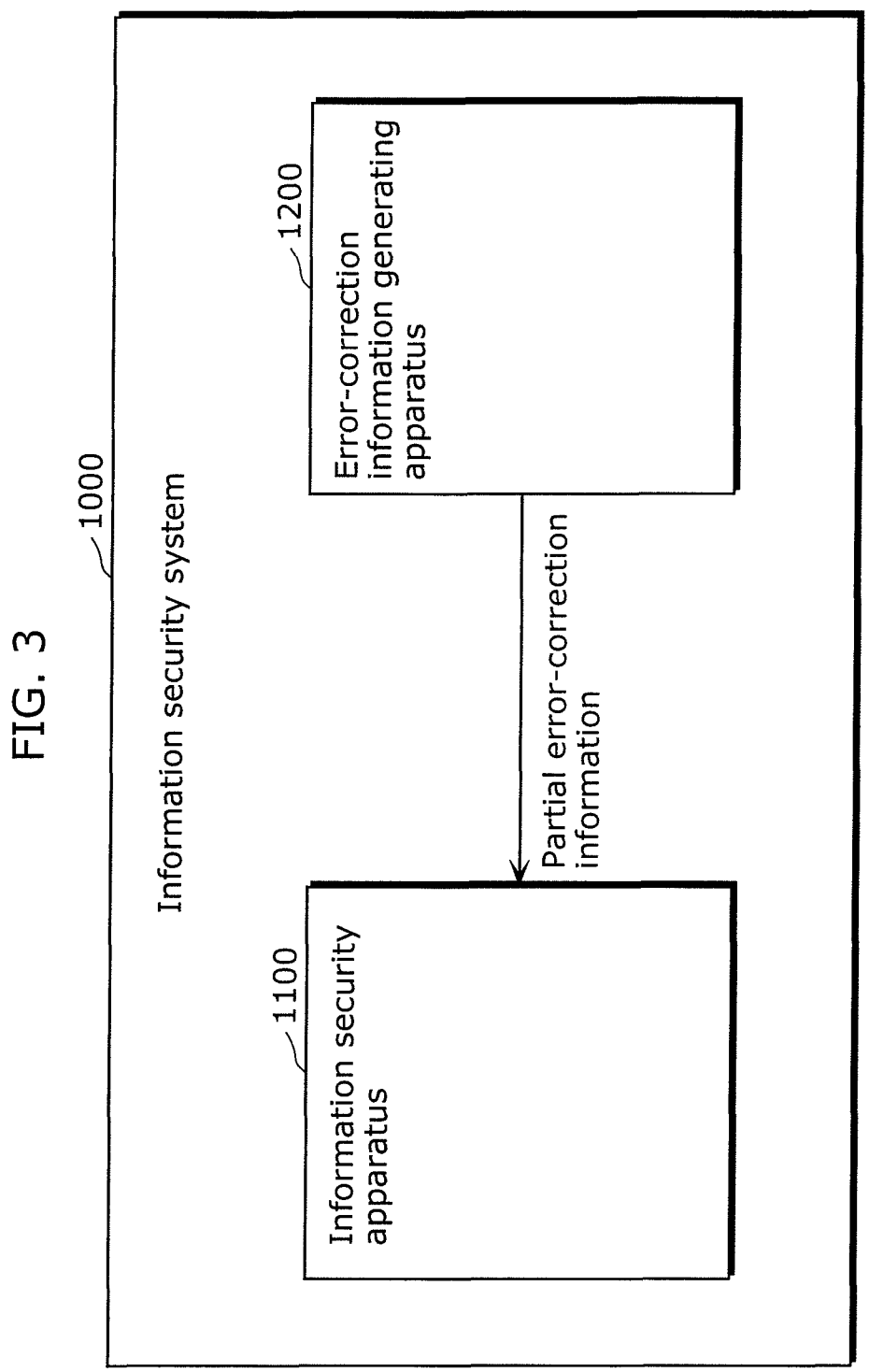
FIG. 3 is a block diagram that shows a configuration of an information security system according to the first embodiment of the present invention.

FIG. 3 shows a configuration of the information security system 1000 as the first embodiment.

The information security system 1000 includes an information security apparatus 1100 that provides increased stability and confidentiality of secret data and an error-correction information generating unit 1200 that generates partial error-correction information and sets the information in the information security apparatus 1100. In the first embodiment, the error-correction information generating unit 1200 is included as a data generating apparatus.

"Configuration of information security apparatus 1100"

Figure 4:
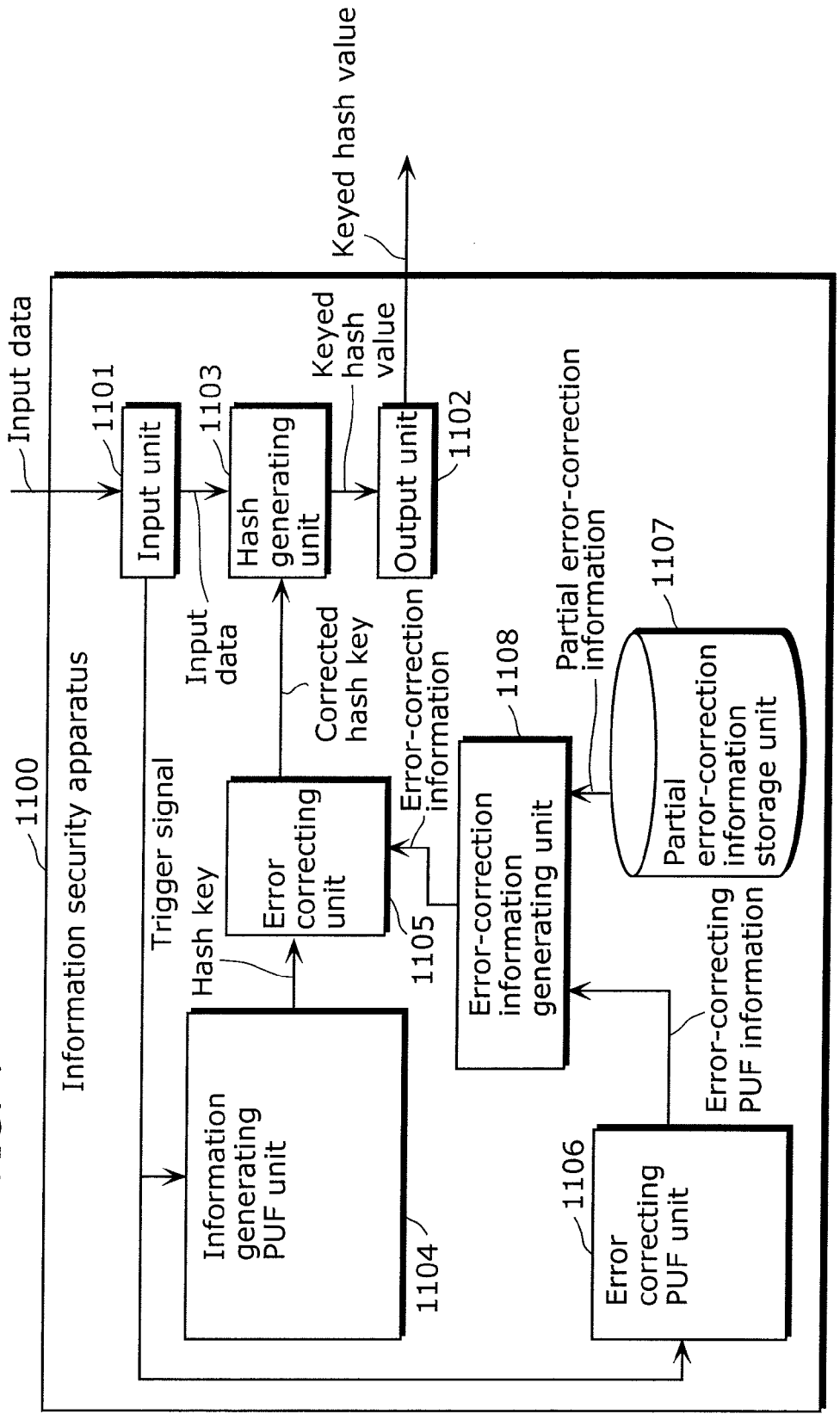
FIG. 4 shows a configuration of an information security apparatus according to the first embodiment.

FIG. 4 shows a configuration of the information security apparatus 1100. The information security apparatus 1100 includes an input unit 1101 that receives input of data (input data), an output unit 1102 that outputs data, a hash generating unit 1103 that calculates a keyed hash value, an information generating PUF unit 1104 that generates a hash key to be a key of a keyed hash function, an error correcting unit 1105 that corrects an error in the hash key and generates a corrected hash key, an error correcting PUF unit 1106 that generates error-correcting PUF information, a partial error-correction information storage unit 1107 that stores the partial error-correction information, and an error-correction information generating unit 1108 that generates error-correction information.

In the first embodiment, the information generating PUF unit 1104 is included as a first tamper-resistant circuit designed to output the hash key, which is preset secret data. The partial error-correction information storage unit is included as a correction data storage unit that stores the partial error-correction information, which is first correction data. The error correcting PUF unit 1106 is included as a second tamper-resistant circuit configured to output the error-correcting PUF information, which is second correction data. The error-correction information generating unit 1108 is included as an error-correction information generating unit that generates error-correction information. The input unit 1101 is included as a receiving unit that receives input data. The hash generating unit 1103 is included as an encrypting unit that encrypts the input data.

The input unit 1101 receives input data that has been externally inputted and transmits the input data to the hash generating unit 1103. When receiving the input data, the input unit 1101 also transmits a trigger to be inputted into the PUF circuit to the information generating PUF unit 1104 and the error correcting PUF unit 1106.

The output unit 1102 outputs a keyed hash value.

The hash generating unit 1103 calculates a keyed hash value using a corrected hash key outputted from the error correcting unit 1105 and the input data received by the input unit 1101, and inputs the keyed hash value into the output unit 1102.

The information generating PUF unit 1104 generates a hash key of a keyed hash function.

Figure 5:
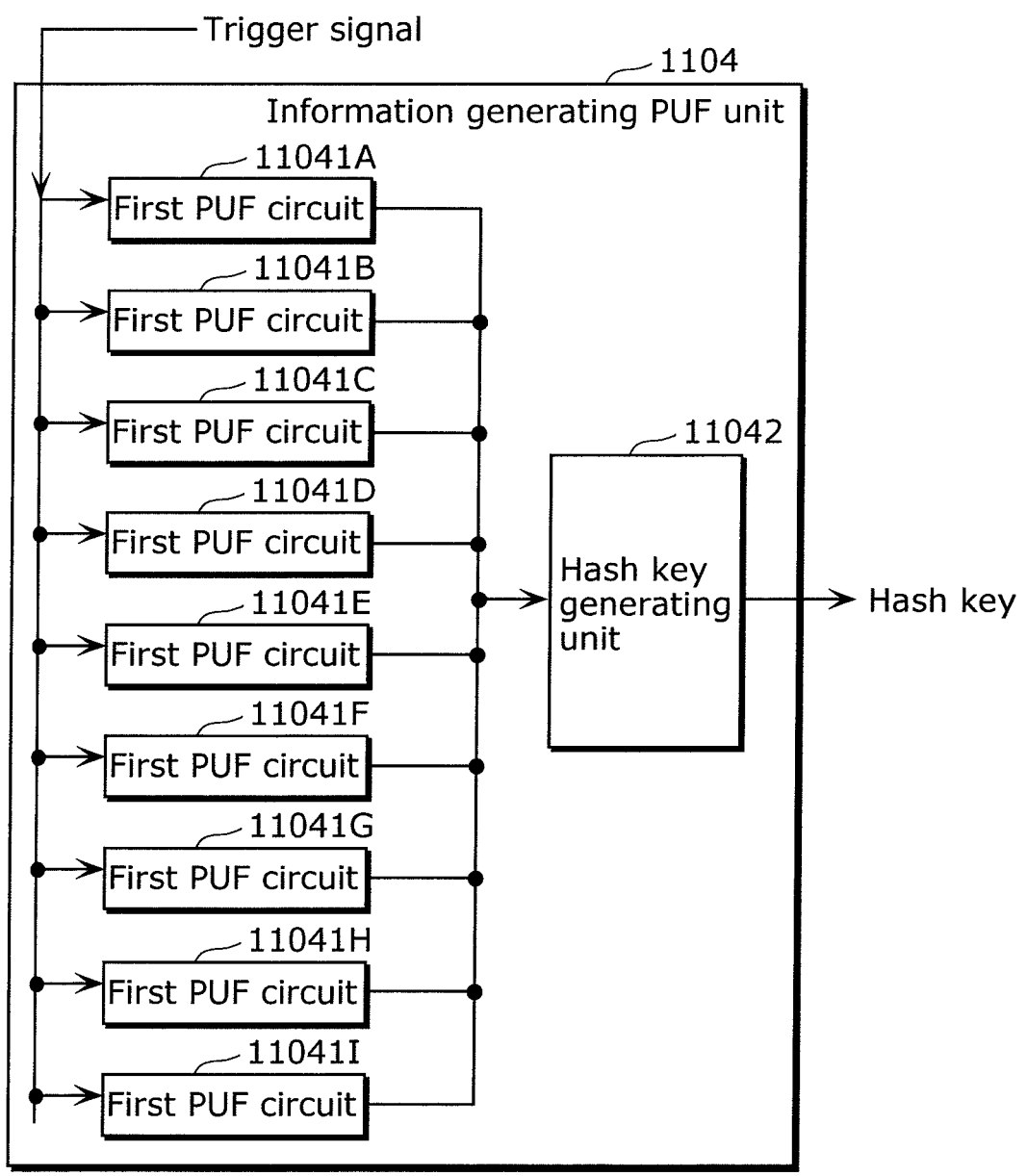
FIG. 5 shows a configuration of an information generating PUF unit according to the first embodiment.

FIG. 5 shows a configuration of an information generating PUF unit 1104.

As shown in FIG. 5, the information generating PUF unit 1104 includes nine first PUF circuits 11041A, 11041B, 11041C, 11041D, 11041E, 11041F, 11041G, 11041H, and 11041I, and a hash key generating unit 11042 that generates a hash key by concatenating bits from the first PUF circuits. The first PUF circuits, which are described below, each output one-bit information, and the information generating PUF unit 1104 concatenates the one-bit information from the nine first PUF circuits and transmits the concatenated information to the error correcting unit 1105. Although the number of the first PUF circuits described above is nine, it may not necessarily be nine but also be any number not less than two.

(Configuration of the First PUF Circuits 11041A . . . 11041G, 11041H, and 11041I)

A configuration of the first PUF circuit 11041A is typically described below because the first PUF circuits 11041A to 11041I have an identical configuration.

Figure 6:
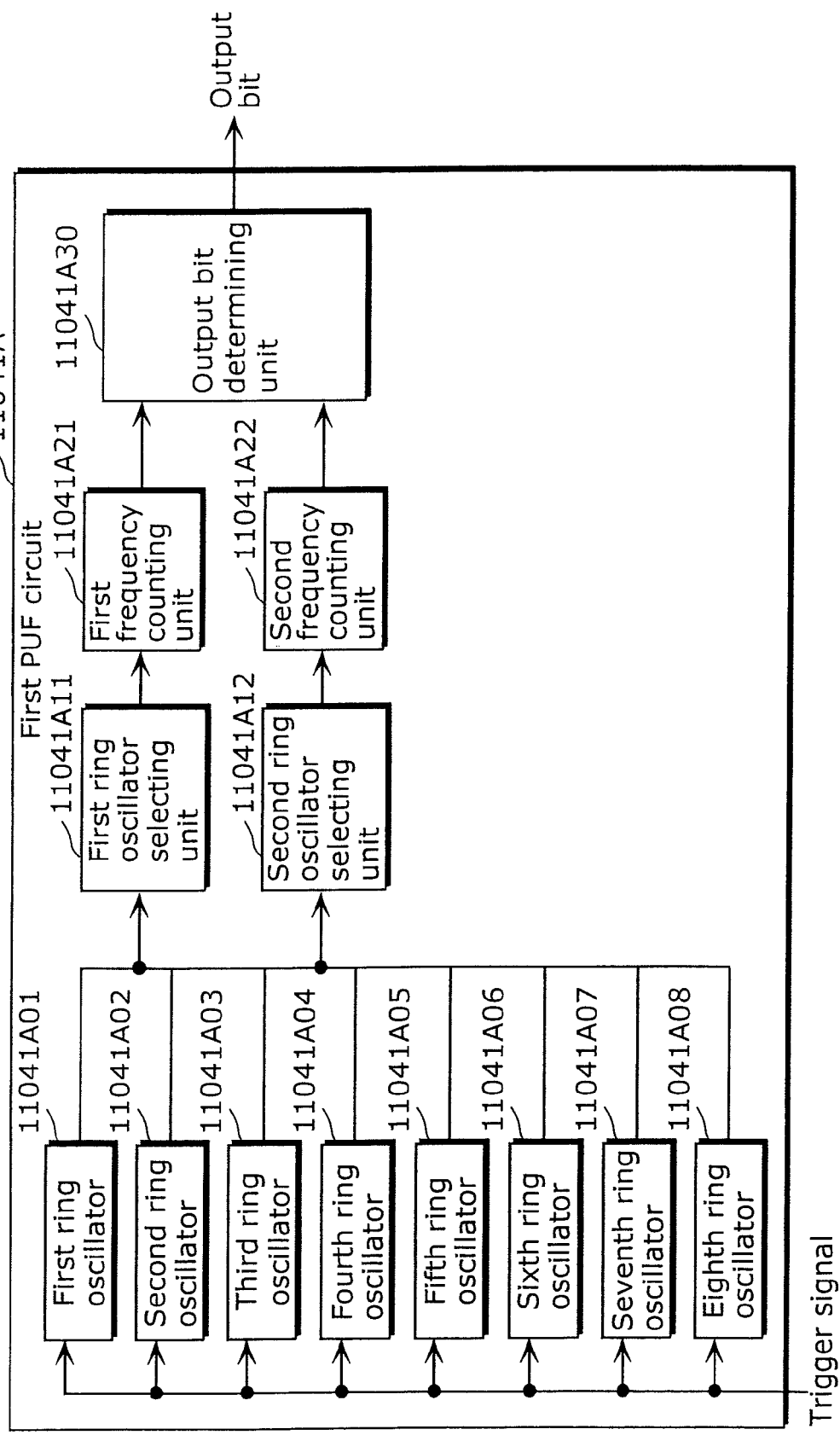
FIG. 6 shows a configuration of a first PUF circuit according to the first embodiment.

FIG. 6 shows the configuration of the first PUF circuit 11041A.

As shown in FIG. 6, the first PUF circuit 11041A includes a first ring oscillator 11041A01, a second ring oscillator 11041A02 . . . , and an eighth ring oscillator 11041A08, a first ring oscillator selecting unit 11041A11, a second ring oscillator selecting unit 11041A12, a first frequency counting unit 11041A21, a second frequency counting unit 11041A22, and an output bit determining unit 11041A30. In the first embodiment, the first to the eighth ring oscillators 11041A01 to 11041A08 are included as oscillation units that each output an oscillation signal. The first and the second ring oscillator selecting units 11041A11 and 11041A12 are included as selecting units that each select from the oscillation units. The output bit determining unit 11041A30 is included as a determining unit that determines an output value of the first PUF circuit 11041A.

The first to the eighth ring oscillators 11041A01 to 11041A08 have an identical configuration and each output an output signal (oscillation signal) when receiving a trigger signal.

The first ring oscillator selecting unit 11041A11 selects a predetermined ring oscillator from the first to the eighth ring oscillators 1041A01 to 11041A08.

The second ring oscillator selecting unit 11041A12 selects a predetermined ring oscillator that is different from the one which the first ring oscillator selecting unit selects, from the first to the eighth ring oscillators 1041A01 to 11041A08. Although the number of ring oscillators described above is eight, any number not less than two is applicable.

The first frequency counting unit 11041A21 counts a frequency of the ring oscillator selected by the first ring oscillator selecting unit 11041A11.

The second frequency counting unit 11041A22 counts a frequency of the ring oscillator selected by the second ring oscillator selecting unit 1041A12.

The output bit determining unit 11041A30 compares frequencies F1 and F2 counted by the first and the second frequency counting units 11041A21 and 11041A22, respectively, and then outputs "0" when F1≧F2, and outputs "1" when F1<F2. Although frequencies are counted in this description, not only frequencies itself but also something approximate to frequencies, such as amount of times for which an output signal from a ring oscillator is of the same as a predetermined oscillation, may be counted instead. In this case, output bits may be determined to be "0" or "1" on the basis of comparison of the amount of the times, instead of comparison of frequency. Additionally, although "0" is outputted when F1≧F2 and "1" when F1<F2 in the description above, "1" may be outputted when F1<F2 and "0" when F1≧F2.

(Operation of the First PUF Circuits 11041A to 11041I)

As in the case of the configuration, an operation of the first PUF circuit 11041A is typically described below.

The first ring oscillator selecting unit 11041A11 selects a predetermined ring oscillator. The second ring oscillator selecting unit 11041A12 also selects a predetermined ring oscillator. The frequency counting unit 11041A21 counts a frequency of the ring oscillator selected by the first ring oscillator selecting unit 11041A11. The second frequency counting unit 11041A22 counts a frequency of the ring oscillator selected by the second ring oscillator selecting unit 1041A12. The output bit determining unit 11041A30 determines an output bit using the frequencies counted by the first frequency counting unit 11041A21 and the second frequency counting unit 11041A22.

(Hash Key Generating Unit 11042)

The hash key generating unit 11042 concatenates bits from the first PUF circuits 11041A to 11041G to generate a hash key.

The error correcting unit 1105 generates a corrected hash key by correcting, using the error-correction information generated by the error-correction information generating unit 1108, an error for the hash key generated in the information generating PUF unit 1104. Any method for error correction can be used here. An example is shown below for simplicity.

Exemplary Method for Error Correction

In this example, three concatenated three-bit repetition codes are used. In repetition coding, "0" is coded into "000" and "1" into "111". Decoding is performed according to the majority value of three bits. For example, a string "101", where 1 holds a two-out-of-three majority, is decoded into "1". In other words, a code is decoded into "0" when the code has a Hamming weight (or the number of 1) of one or less, and into "1" when two or more.

It is assumed that an error-correction information is "010 010 001", and that a hash key generated in the information generating PUF unit 104 is "101 000 111". The error correcting unit 1105 XORs the error-correction information and the hash key.

"010010001"XOR"101000111"="111010110"

When this is decoded, the first repetition code "111" is decoded into "1", the second one "010" into "0", and the third one "110" into "1".

Therefore, the corrected hash key for this example is "101".

The error correcting PUF unit 1106 generates error-correcting PUF information.

Figure 7:
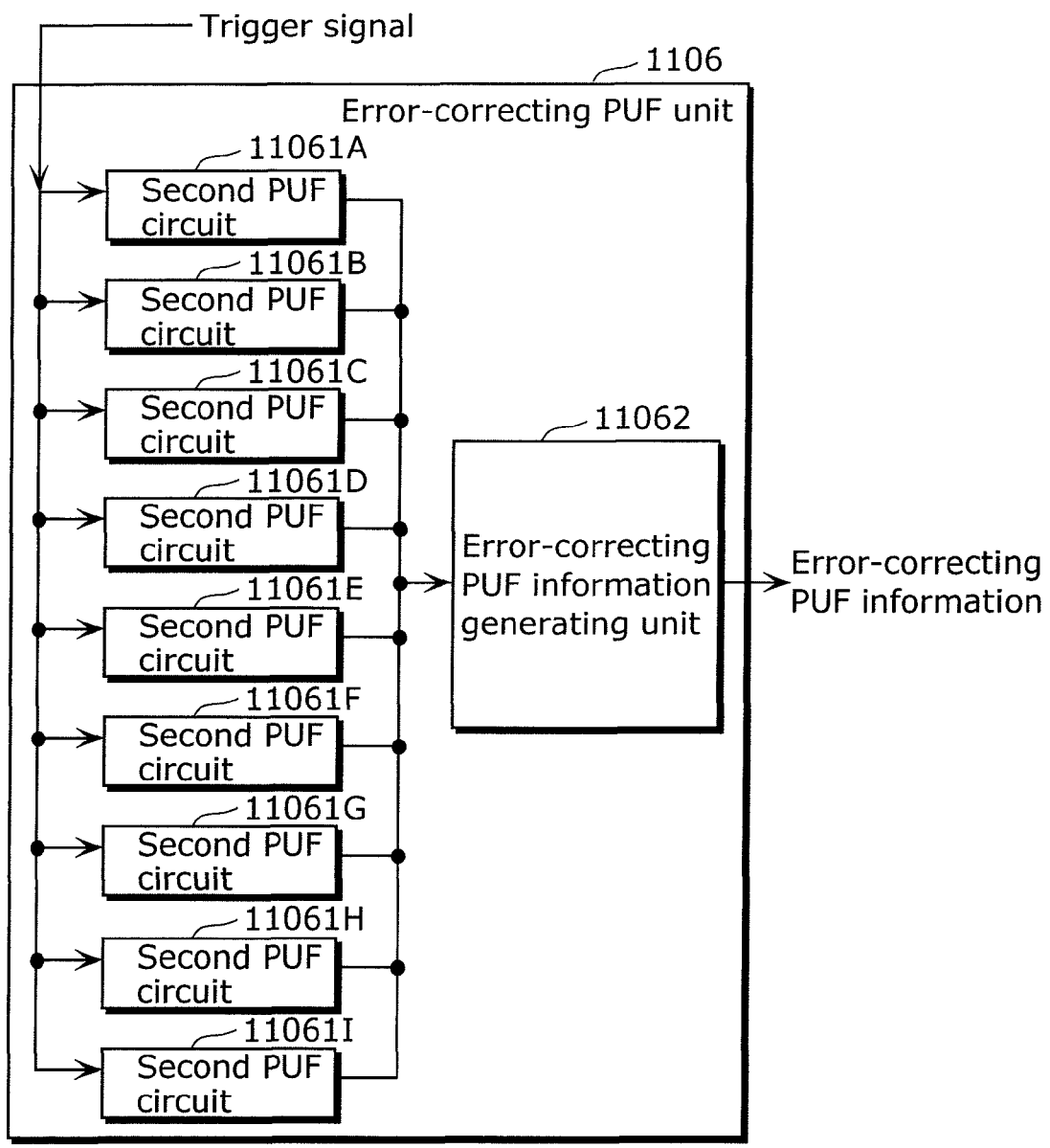
FIG. 7 shows a configuration of an error correcting PUF unit according to the first embodiment.

FIG. 7 shows a configuration of the error correcting PUF unit 1106.

As shown in FIG. 7, the error correcting PUF unit 1106 includes nine second PUF circuits 11061A, 11061B, 11061C, 11061D, 11061E, 11061F, 11061G, 11061H, and 11061I, and an error-correcting PUF information generating unit 11062 that generates error-correcting PUF information by concatenating bits from the second PUF circuits. The second PUF circuits, which are described below, each output three-bit information, and the error correcting PUF unit 1106 concatenates the three-bit information from the nine second PUF circuits to transmit the concatenated information to the error-correction information generating unit 1108. Although the number of the second PUF circuits is nine, it may not necessarily be nine but any number equal to or greater than two.

(Configuration of the Second PUF Circuits 11061A to 11061I)

A configuration of the second PUF circuit 11061A is typically described below because the second PUF circuits 11061A to 11061I have an identical configuration.

Figure 8:
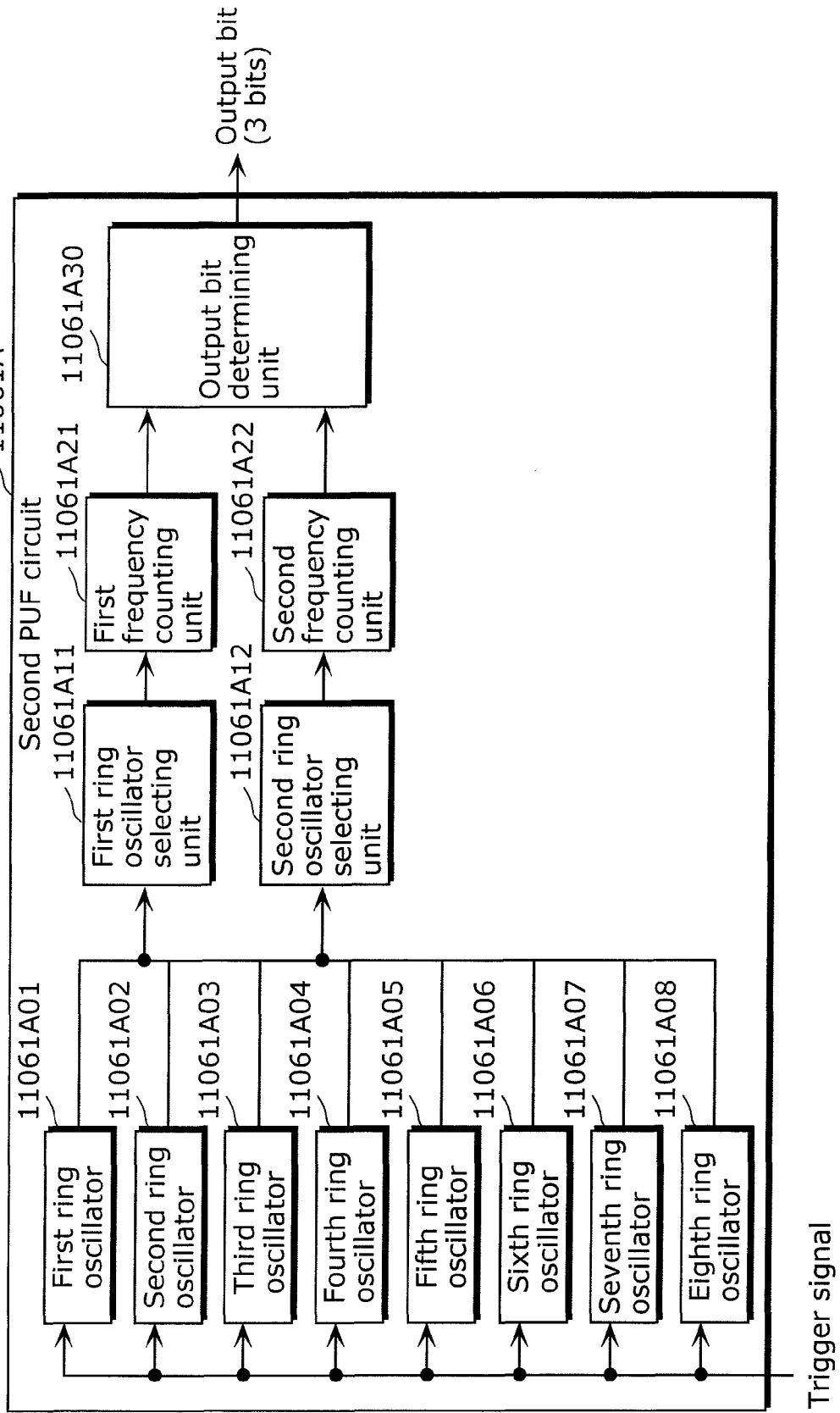
FIG. 8 shows a configuration of a second PUF circuit according to the first embodiment.

FIG. 8 shows the configuration of the second PUF circuit 11061A.

As shown in FIG. 8, the second PUF circuit 11061A includes a first ring oscillator 11061A01, a second ring oscillator 11061A02 . . . , and an eighth ring oscillator 11061A08, a first ring oscillator selecting unit 11061A11 and a second ring oscillator selecting unit 11061A12, a first frequency counting unit 11061A21 and a second frequency counting unit 11061A22, and an output bit determining unit 11061A30.

The first to the eighth ring oscillators 11061A01 to 11061A08 have an identical configuration and each output an output signal when receiving a trigger signal.

The first ring oscillator selecting unit 11061A11 selects a predetermined ring oscillator from the first to the eighth ring oscillators 11061A01 to 11061A08.

The second ring oscillator selecting unit 11061A12 selects a predetermined ring oscillator that is different from the one which the first ring oscillator selecting unit selects, from the first to eighth ring oscillators 11061A01 to 11061A08. Although the number of ring oscillators described above is eight, any number not less than two is applicable.

The first frequency counting unit 11061A21 counts a frequency of the ring oscillator selected by the first ring oscillator selecting unit 11061A11.

The second frequency counting unit 11061A11 counts a frequency of the ring oscillator selected by the second ring oscillator selecting unit 11061A12.

The output bit determining unit 11061A30 compares frequencies F1 and F2 counted by the first and the second frequency counting units 11061A21 and 11061A22, respectively, and then outputs a three-bit element that represents a value from "0" to "7" according to the difference between F1 and F2.

Figure 9:
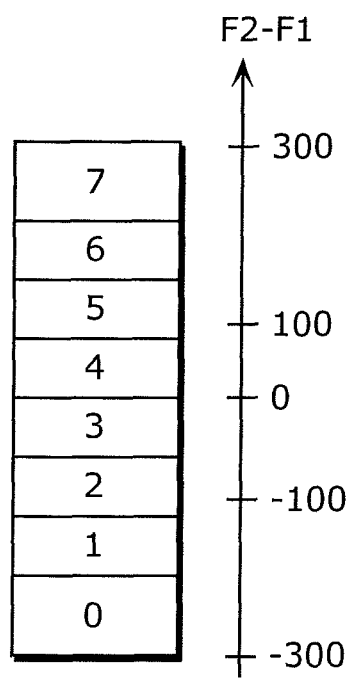
FIG. 9 shows how differences of the second PUF circuit are mapped against output values according to the first embodiment.

FIG. 9 shows how differences of the frequencies (F2–F1) are mapped against three-bit values. According to FIG. 9, differences from –300 to 300 are evenly split into eight ranges and the ranges are each mapped on from "0" to "7". It is noted that there are applicable methods for mapping other than this. Differences may range from –500 to 500, for example, and may de split not evenly but unevenly to be mapped on respective values.

(Operation of the Second PUF Circuits 11061A to 11061I)

As in the case of the configuration, an operation of the second PUF circuit 11061A is typically described below.

The first ring oscillator selecting unit 11061A11 selects a predetermined ring oscillator. The second ring oscillator selecting unit 11061A12 also selects a predetermined ring oscillator. The first frequency counting unit 11061A21 counts a frequency of the ring oscillator selected by the first ring oscillator selecting unit 11061A11. The second frequency counting unit 11061A21 counts a frequency of the ring oscillator selected by the second ring oscillator selecting unit 11061A12. The output bit determining unit 11061A30 determines an output of three bits using the frequencies counted by the first frequency counting unit 11061A21 and the second frequency counting unit 11061A22. In other words, the output bit determining unit uses the mapping shown in FIG. 9 to determine a three-bit value that corresponds to a difference between frequencies counted by the first frequency counting unit 11061A21 and the second frequency counting unit 11061A22. For example, the output bit determining unit 11061A30 determines a difference that is 0 or above and below 75 as "4", and a difference that is 75 or above and below 150 as "5".

(Error-Correcting PUF Information Generating Unit 11062)

The error-correcting PUF information generating unit 11062 concatenates elements that are each outputted from the second PUF circuits 11061A to 11061I to generate error-correcting PUF information. For example, when the second PUF circuits 11061A to 11061I output elements of "2", "6", "5", "1", "5", "7", "2", "3", and "7", respectively, error-correcting PUF information "265 157 237" is generated.

The partial error-correction information storage unit 1107 stores partial error-correction information that is partial information of error-correction information. The partial error-correction information is generated and stored in the error-correction information generating unit 1200.

The error-correction information generating unit 1108 generates error-correction information using error-correcting PUF information generated by the error correcting PUF unit 1106 and partial error-correction information stored in the partial error-correction information storage unit 1107. An exemplary method for generating error-correction information is described below. Although this example shows a method where error-correcting PUF information is coded using a predetermined method and resulting coded error-correcting PUF information and partial error-correction information are XORed, a method for generating error-correction information is not limited to this. A Galois field multiplication may be performed instead of the XOR operation. Addition of the coded error-correcting PUF information and the partial error-correction information with an assumption that they are integers may also be performed instead of the XOR operation.

(Example of Generation of Error-Correction Information)

It is assumed that error-correcting PUF information outputted by the error correcting PUF unit 1106 is "265 157 237" as mentioned above. Each element of this information is coded into a one-bit value: "0" when the element is three or less, and "1" when it is four or greater. Accordingly, this information is coded into "011 011 001", which is coded error-correcting PUF information. Then, a difference between it and partial error-correction information stored in the partial error-correction information storage unit 1107 is calculated. When the partial error-correction information is "001 001 000", error-correcting information is calculated as follows:

"011011001"XOR"001001000"="010010001".

It is noted that a method for coding is not limited to this. For example, an element that is equal to or greater than four may be coded into "0", and an element equal to or less than three may be coded into "1".

(Configuration of Error-Correction Information Generating Unit 1200)

Figure 10:
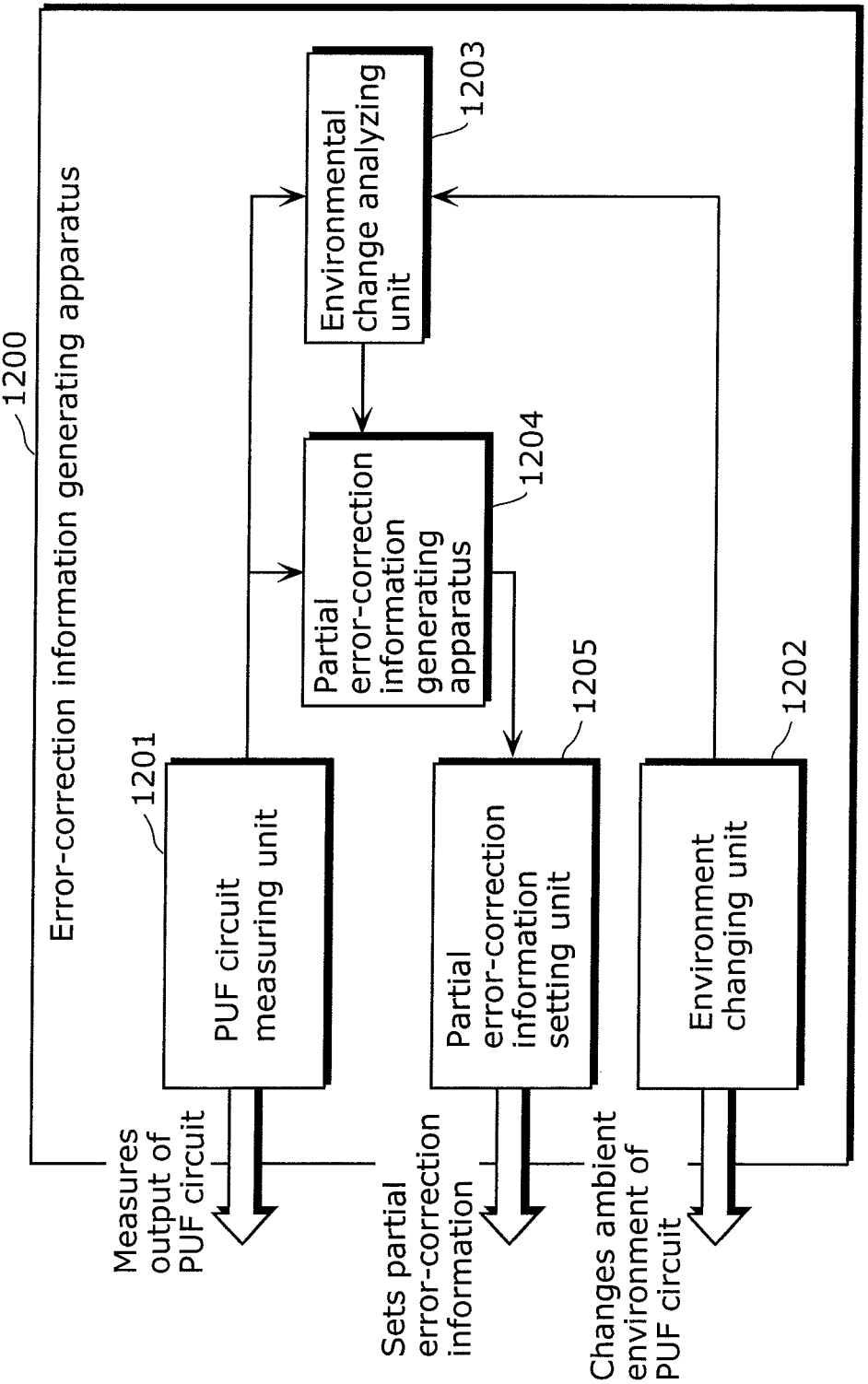
FIG. 10 shows a configuration of the error-correction information generating unit according to the first embodiment.

FIG. 10 shows a configuration of the error-correction information generating unit 1200. The error-correction information generating unit 1200 includes a PUF circuit measuring unit 1201 that measures output values from the first and the second PUF circuits in the information security apparatus 1100, an environment changing unit 1202 that changes ambient environment of the first and the second PUF circuits, an environmental change analyzing unit 1203 that analyzes distribution of the output values measured by the PUF circuit measuring unit 1201, a partial error-correction information generating unit 1204 that generates partial error-correction information according to a result of the analysis by the environmental change analyzing unit 1203, and a partial error-correction information setting unit 1205 that stores the partial error-correction information in the partial error-correction information storage unit 1107 in the information security apparatus 1100. In the first embodiment, the PUF circuit measuring unit 1201 is included as first and second measuring units. The partial error-correction information generating unit 1204 is included as a data generating unit. The partial error-correction information setting unit 1205 is included as a storage processing unit. The partial error-correction information generating unit 1204 according to the first embodiment includes a first generating unit that generates error-correction information and a second generating unit that generates partial error-correction information that is first correction data using the error-correction information.

The PUF circuit measuring unit 1201 measures output values from the first PUF circuits 11041A to 11041I and the second PUF circuits 11061A to 11061I.

The environment changing unit 1202 changes ambient environment of the first and the second PUF circuits. Specifically, it changes ambient temperature, for example.

The environmental change analyzing unit 1203 analyzes distribution of the output values measured by the PUF circuit measuring unit 1201. In other words, it determines distribution of output values from the first and the second PUF circuits on the basis of temperatures.

The partial error-correction information generating unit 1204 generates partial error-correction information.

(Process of Partial Error-Correction Information Generating Unit 1204)

The partial error-correction information generating unit 1204 first obtains error-correction information on the basis of the distribution of the output values from the first PUF circuit analyzed by the environmental change analyzing unit 1203.

FIG. 11 shows an example of distribution of the output values from the first and the second PUF circuits. Specific examples include a case where error-correction information is obtained by calculating differences between a value that occur at the highest probability in distribution of output values from the first PUF circuits and a value obtained by coding the values using an error-correction code. Considering the exemplary method for error correction and the example of generation of error-correction information described above, an output value with the highest probability of occurrence is "101 000 110", which is a string made up of output values from the nine first PUF circuits 11041A to 11041I. The output value with the highest probability of occurrence is determined for each three-bit string because three-bit repetition codes are used as an example here. FIG. 11 shows that the first three-string is "100" at 0° C., "101" at 10° C., and "101" at 20° C. The output value with the highest probability of occurrence is therefore "101". Similarly, the second one with the highest probability is "000", and the third one is "110". Coding the output value using three three-bit repetition codes provides "111 000 111". Accordingly, the difference between the output value and the coded output value is obtained as follows:

"101000110"XOR"111000111"="010000001".

This is error-correction information.

Next, the partial error-correction information generating unit 1204 obtains error-correcting PUF information on the basis of distribution of output values outputted from the second PUF circuits. The distribution has been analyzed by the environmental change analyzing unit 1203. FIG. 11 shows an example of distribution of output values. An output value from each of the second PUF circuits is a three-bit element. FIG. 11 shows output values from the second PUF circuits 11061A to 11061I consequently from left to right. Specific examples of a method for generating partial error-correction information includes a method in which the partial error-correction information is obtained by calculating a difference between error-correction information and coded error-correcting PUF information that is obtained by coding, using a predetermined method, an output value occurring at the highest probability in distribution of output values of elements from the second PUF circuits. FIG. 11 shows that the first element is "3" at 0° C., "2" at 10° C., and "2" at 20° C. The output value with the highest probability of occurrence is therefore "2". These elements are coded into one-bit values when the same method for coding as in the example of generation of error-correction information is used: elements equal to or less than four are coded into "0", and elements equal to or greater than five into "1". In FIG. 11, the first element "2" is coded into "0". A coded error-correcting PUF information "011 011 001" is obtained by coding the rest of the elements. The difference of the coded error-correcting PUF information and error-correction information is calculated as follows:

"010000001"XOR"011011001"="001011000".

The resulting "001 011 000" is partial error-correction information.

The partial error-correction information setting unit 1205 stores, in the partial error-correction information storage unit 1107 in the information security apparatus 1100, the partial error-correction information generated in the partial error-correction information generating unit 1204.

"Operation of Information Security System 1000"

Figure 12B:
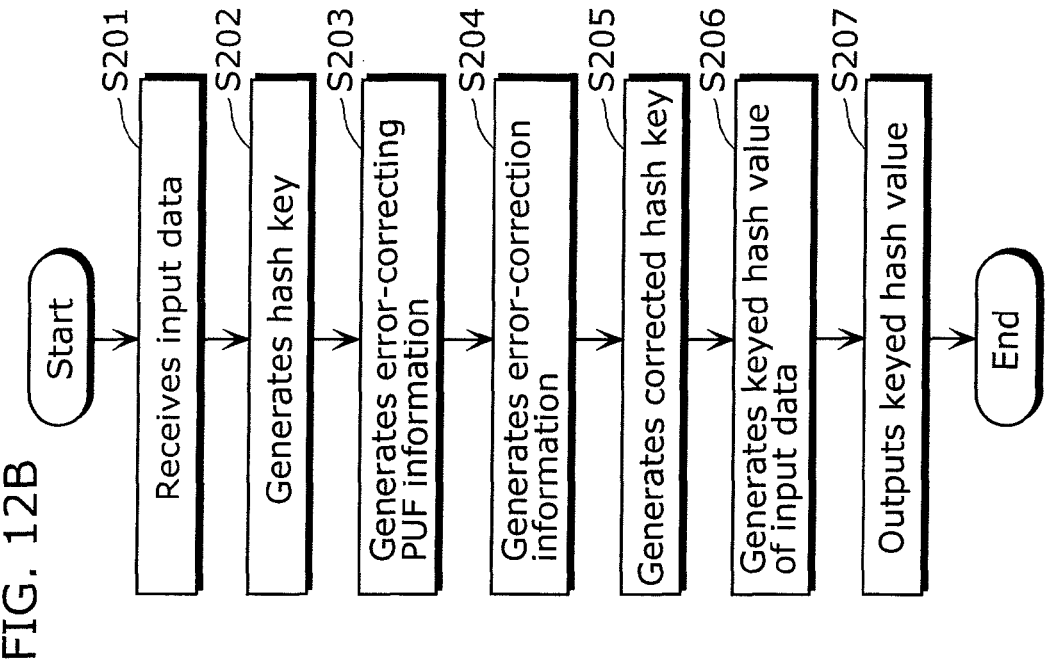
FIG. 12B is a flowchart that shows an operation when the information security apparatus according to the first embodiment calculates a keyed hash value.
Figure 12A:
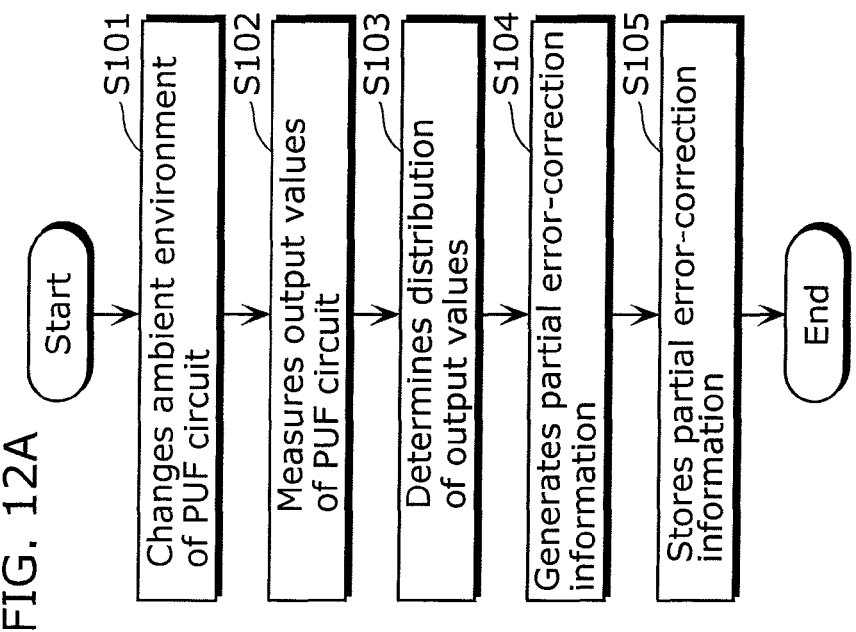
FIG. 12A is a flowchart that shows an operation when the error-correction information generating unit according to the first embodiment sets partial error-correction information.

FIG. 12A is a flowchart that shows an operation of setting of partial error-correction information by the error-correction information generating unit 1200 of the information security system 1000.

The error-correction information generating unit 1200 follows the steps below to set partial error-correction information. The partial error-correction information is generated and set in the partial error-correction information storage unit 1107 in the information security apparatus 1100 when the information security apparatus 1100 is manufactured.

Step S101: The environment changing unit 1202 changes ambient environment of the first and the second PUF circuits. Furthermore, the environment changing unit 1202 changes input information of the changed environment into the environmental change analyzing unit 1203.

Step S102: The PUF circuit measuring unit 1201 measures output values from the first and the second PUF circuits and input the measured output values into the environmental change analyzing unit 1203.

Step S103: The environmental change analyzing unit 1203 determines distribution of output values from the first and the second PUF circuits on using the information of the environment.

Step S104: The partial error-correction information generating unit 1204 generates partial error-correction information on the basis of the distribution of the output values.

Step S105: The partial error-correction information setting unit 1205 stores the partial error-correction information in the partial error-correction information storage unit 1107 in the information security apparatus 1100.

FIG. 12B is a flowchart that shows an operation of the information security apparatus 1100 of the information security system 1000 when the information security apparatus 1100 calculates a keyed hash value.

The information security apparatus 1100 follows the steps below to calculate a keyed hash value. The information security apparatus 1100 generates and outputs a keyed hash value for input data upon input by a user or upon a trigger from an application program.

Step S201: The input unit 1101 receives external input data and transmits it to the hash generating unit 1103. Furthermore, the input unit 1101 transmits a trigger signal for the PUF circuits to the information generating PUF unit 1104 and the error correcting PUF unit 1106.

Step S202: The information generating PUF unit 1104 generates a hash key and inputs the generated hash key into the error correcting unit 1105.

Step S203: The error correcting PUF unit 1106 generates error-correcting PUF information and inputs the generated error-correcting PUF information into the error-correction information generating unit 1108.

Step S204: The error-correction information generating unit 1108 generates error-correction information using partial error-correction information stored in the partial error-correction information storage unit 1107 and the error-correcting PUF information and inputs the generated error-correction information into the error correcting unit 1105.

Step S205: The error correcting unit 1105 corrects an error for the hash key using the error-correction information to generate a corrected hash key and inputs the corrected hash key into the hash generating unit 1103.

Step S206: The hash generating unit 1103 generates a keyed hash value of the input data using the corrected hash key as a key and inputs the keyed hash value into the output unit 1102.

Step S207: The output unit 1102 outputs the keyed hash value.

As described above, the information security apparatus 1100 according to the first embodiment stores not error-correction information but partial error-correction information directly in memory. This prevents attackers from direct access to the error-correction information; thus the attackers cannot easily obtain a secret in the PUF, that is, the hash key, and the hash key is secured. Furthermore, with the error correcting PUF unit 1106 and the error-correction information generating unit 1108, errors are properly corrected by restoring error-correction information from the partial error-correction information.

(Second Embodiment)

Errors of hash keys of the information generating PUF unit 1104 described in the first embodiment may occur due to not only environmental change but also change in frequency characteristics of the PUF circuits due to age. The second embodiment reduces errors of hash keys outputted from the information generating PUF unit 1104 by reducing change due to age in outputs from the PUF circuit in the configuration of the information security system 1000.

Hereinafter, the second embodiment of the present invention is described with reference to figures.

(Configuration of PUF Circuit 1)

Figure 13:
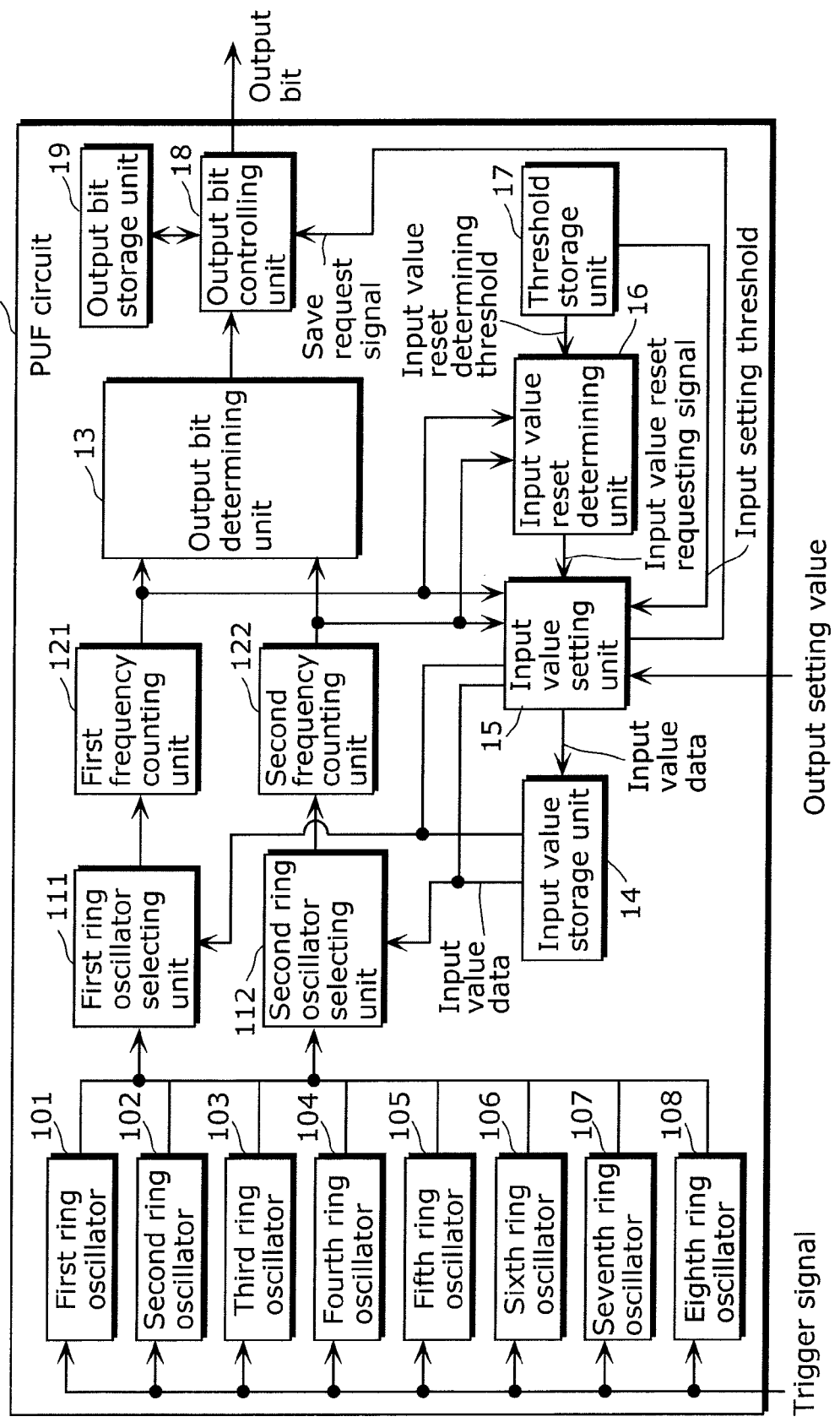
FIG. 13 is a block diagram that shows a configuration of a PUF circuit according to the second embodiment of the present invention.

FIG. 13 is a block diagram that shows an exemplary configuration of a PUF circuit 1 according to the second embodiment of the present invention. The PUF circuit 1 corresponds to respective first PUF circuits 11041A to 11041I in the first embodiment and includes first to eighth ring oscillators 101 to 108, first and second ring oscillator selecting units 111 and 112, first and second frequency counting units 121 and 122, an output bit determining unit 13, an input value storage unit 13, an input value storage unit 14, an input value setting unit 15, an input value reset determining unit 16, a threshold storage unit 17, an output bit control unit 18, and an output bit storage unit 19.

In the second embodiment, the output bit storage unit 19 is included as a secret-data memory unit that stores a hash key, which is secret data. The output bit control unit 18 is included as a storage unit that stores a part of the hash key in the output bit storage unit 19 and also as an output control unit that outputs the part of the hash key stored in the output bit storage unit 19. Each unit is described in detail below.

(1) First to Eighth Ring Oscillators 101 to 108

The first to the eighth ring oscillators 101 to 108 are oscillation circuits each including an odd number of inverter circuits connected to form a ring and each output an oscillation signal (output signal) of a predetermined oscillation frequency when receiving a trigger signal. A configuration and an operation of described below are common to these eight ring oscillators, which are referred to as ring oscillators 100.

Figure 14:
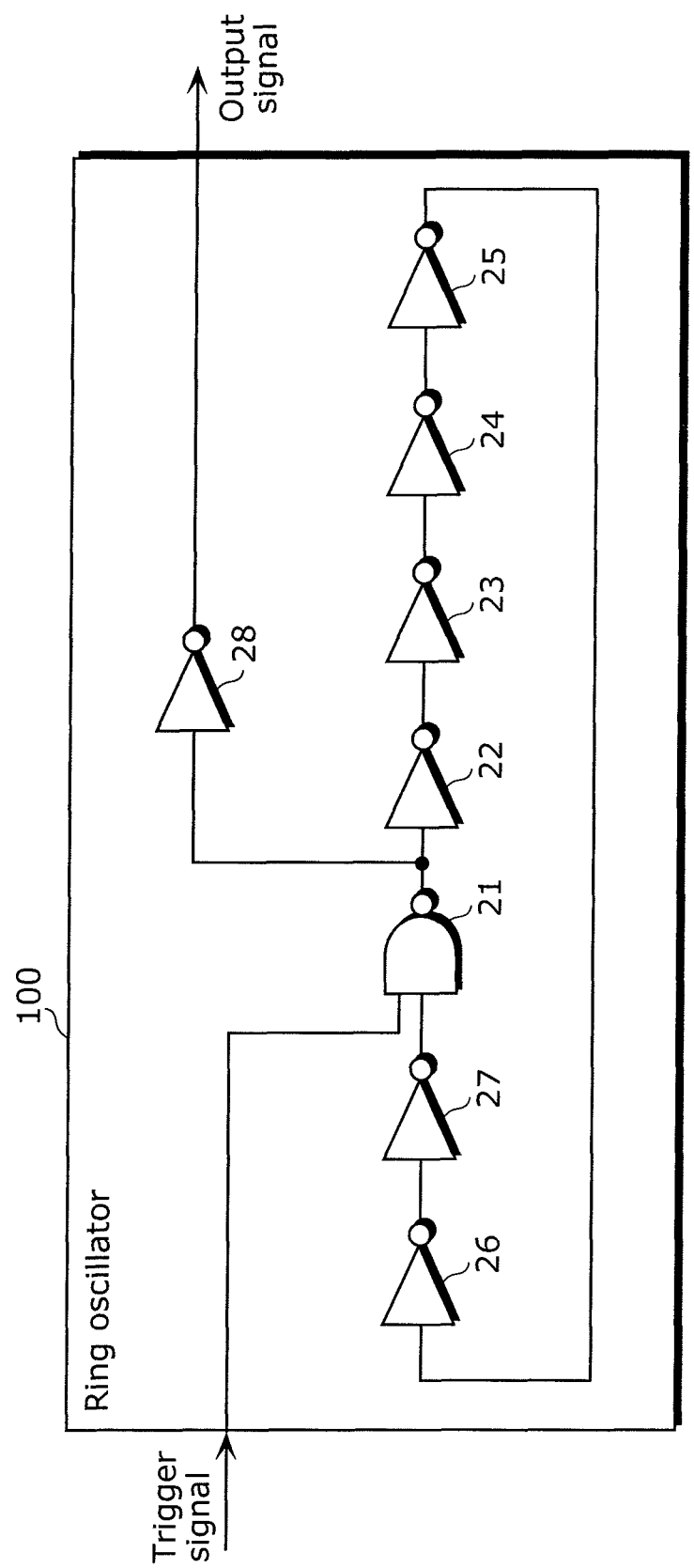
FIG. 14 is a block diagram that shows a configuration of a ring oscillator according to the second embodiment.

FIG. 14 is a block diagram that shows an exemplary configuration of one of the ring oscillators 100. The ring oscillator 100 is a seven-stage ring oscillator including a NAND circuit 21 and seven inverter circuits 22 to 28. Although the seven-stage oscillator is used in the second embodiment, the number of stages may be any odd number.

The NAND circuit 21 outputs "1" when no trigger signal is inputted into the ring oscillator 100, in other words, when a trigger signal of "0" is inputted. Accordingly, the inverter circuit 22 outputs "0", the inverter circuit 23 outputs "1" . . . , and the inverter circuit 27 outputs "1" (which is one of inputs into the NAND circuit 21). As the other input of the NAND circuit 21 is "0", the NAND circuit 21 still outputs "1". This means that the ring oscillator 100 is stable in such a steady state. In this case, the output from the inverter circuit 28, that is, an output signal of the ring oscillator 100 remains "0". In summary, when a trigger signal to the ring oscillator 100 is "0", the ring oscillator 100 does not oscillate and an output signal therefrom remains "0".

On the other hand, the NAND circuit 21 outputs "1" when a trigger signal is inputted into the ring oscillator 100, in other words, when a trigger signal of "1" is inputted. Accordingly, the inverter circuit 22 outputs "0", the inverter circuit 23 outputs "1" . . . , and the inverter circuit 27 outputs "1". In this case, as both of the two inputs of the NAND circuit 21 are "1", the output from the NAND circuit 21 transits from "1" to "0". Accordingly, the inverter circuit 22 outputs "1", the inverter circuit 23 outputs "0" . . . , and the inverter circuit 27 outputs "0". In this case, as one of the inputs of the NAND circuit 21, the output from the NAND circuit 21 transits again from "0" to "1". As described above, when the ring oscillator 100 receives a trigger signal of "1", the internal state of the ring oscillator 100 keeps changing, and the output of the NAND circuit 21 repeatedly transits between "1" and "0" to oscillate. In this case, the ring oscillator 100 outputs an oscillation signal of a predetermined oscillation frequency. The oscillation frequency is determined by the number of stages of the ring oscillator. In theory, oscillation signals from ring oscillators having the same number of stages and configuration are of the same oscillation frequency. However, in practice, there are slight differences among the oscillation frequencies even among ring oscillators with the same configuration because of variations in frequency characteristics of circuit elements that compose the ring oscillators. It is noted that the oscillation stops and the output signal becomes "0" because the NAND circuit 21 stably outputs "1" when the trigger signal changes to "0" in the oscillation.

(2) First and Second Ring Oscillator Selecting Units 111 to 112

The first and the second ring oscillator selecting units 111 and 112 each select one of the first to the eighth ring oscillators 101 to 108 on the basis of three-bit input data inputted from the input value storage unit 14, and then obtain oscillation signals from the selected ring oscillators to input the oscillation signals into the first frequency counting unit 121 and the second first frequency counting unit 122, respectively. In other words, the first ring oscillator selecting unit 111 selects a ring oscillator, obtains an oscillation signal outputted from the selected ring oscillator, and inputs the oscillation signal into the first frequency counting unit 121. The second ring oscillator selecting unit 112 selects a ring oscillator, obtains an oscillation signal outputted from the selected ring oscillator, and inputs the oscillation signal into the second frequency counting unit 122.

Any correspondence between three-bit input value data and ring oscillators to be selected is applicable as long as any input value data corresponds to one of the ring oscillators. Exemplary correspondence in the second embodiment is as follows: the first ring oscillator 101 is selected by each of the first and the second ring oscillator selecting units 111 and 112 when they receive input value data of "000" (in binary); the second ring oscillator 102 is selected when they receive input value data of "001" (in binary); the third ring oscillator 103 is selected when they receive input value data of "010" (in binary); . . . and the eighth ring oscillator 108 is selected when they receive input value data of "111" (in binary). It is noted that the first and the second ring oscillator selecting units 111 and 112 receive input value data and select different ring oscillators (3) The First and the Second Frequency Counting Units 121 and 122

The first and the second frequency counting units 121 and 122 count oscillation frequencies of the oscillation signals inputted from the first ring oscillator selecting unit 111 and the second ring oscillator selecting unit 112, respectively, and then input results of the counting into the output bit determining unit 13. In other words, the first frequency counting unit 121 counts an oscillation frequency of an oscillation signal received from the first ring oscillator selecting unit 111. The second frequency counting unit 121 counts an oscillation frequency of an oscillation signal received from the second ring oscillator selecting unit 122.

(4) Output Bit Determining Unit 13

The output bit determining unit 13 compares magnitudes of the oscillation frequencies received from the first and the second frequency counting units 121 and 122, determines a value of a one-bit output bit on the basis of a result of the comparison, and then inputs an output bit that represents the determined value into the output bit controlling unit 18.

Any correspondence between results of comparison and values of output bits is applicable. In the second embodiment, a value of an output bit is determined as "1" when (counted frequency of the first frequency counting unit 121)<(counted frequency of the second frequency counting unit 122). Otherwise, it is determined as "0".

(5) Output Bit Controlling Unit 18

When the PUF circuit 1 receives an external trigger signal to request to output an output bit, the output bit controlling unit 18 first checks whether or not an output bit is stored in the output bit storage unit 19. When an output bit is stored, the stored output bit is outputted from the PUF circuit, and the process is completed. When the output bit storage unit 19 does not store any output bit, an output bit is inputted from the output bit determining unit 13. This is followed by the process described below.

The output bit controlling unit 18 first stores the output bit from the output bit determining unit 13 temporarily. When receiving a signal, from the input value setting unit 15, to request to save the output bit stored temporarily, the output bit controlling unit 18 outputs the temporarily stored output bit to outside the PUF circuit 1 and to the output bit storage unit 19 as well. On the other hand, when not receiving the signal, from the input value setting 15, to request to save the output bit, the output bit controlling unit 18 outputs the output bit stored temporarily to outside the PUF circuit 1.

(6) Input Value Storage Unit 14

The input value storage unit 14 stores two three-bit input data items to be inputted into the first ring oscillator selecting unit 111 and the second ring oscillator selecting unit 112. Hereinafter, three-bit input data to be inputted into the first ring oscillator selecting unit 111 is referred to as a first input value data, and three-bit input data to be inputted into the second ring oscillator selecting unit 112 as a second input value data.

(7) Input Value Setting Unit 15

The input value setting unit 15 operates at initialization or when a signal to request to reset of an input value is inputted from the input value reset determining unit 16. The input value setting unit 15 sets input value data items (of three bits) to be inputted to the first ring oscillator selecting unit 111 and to the second ring oscillator selecting unit 112 so that the ring oscillators select two ring oscillators between which frequencies differ by at least a threshold for setting of input stored in the threshold storage unit 17.

Specifically, at initialization, the input value setting unit 15 obtains an output setting value from outside the PUF circuit 1 and sets input value data items to be inputted into the first ring oscillator selecting unit 111 and the second ring oscillator selecting unit 112 so that the PUF circuit 1 outputs an output bit that represents the output setting value. In this case, when the output setting value is "1", the input value setting unit 15 sets two input value data items so that two ring oscillators are selected where (frequency counted by the first frequency counting unit 121)<(frequency counted by the second frequency counting unit 122) and the absolute value of the difference between these two frequencies is equal to or greater than the threshold for setting of input. When the output setting value is "0", the input value setting unit 15 sets two input value data items so that two ring oscillators are selected where (frequency counted by the first frequency counting unit 121)≧(frequency counted by the second frequency counting unit 122) and the absolute value of the difference between these two frequencies is equal to or greater than the threshold for setting of input.

When receiving a signal to request to reset of an input value, the input value setting unit 15 resets two input values so that two ring oscillators are selected again where the absolute value of the difference between a frequency counted by the first frequency counting unit 121 and a frequency counted by the second frequency counting unit 122 is equal to or greater than the threshold for setting of input and the magnitude ordering between them is maintained.

When the input value setting unit 15 fails to set input value data such that two ring oscillators between which frequencies differ by at least the threshold for setting of input (that is, a pair of ring oscillators between which frequencies differ by at least the threshold are not identified), the input value setting unit 15 transmits a signal to request to save the output bit to the output bit controlling unit 18.

In the second embodiment, the first ring oscillator selecting unit 111, the second ring oscillator selecting unit 112, the input value storage unit 14, and the input value setting unit 15 are included as a selecting unit that selects two ring oscillators from among eight ring oscillators. The input value setting unit 15 is included as a searching unit that searches for two ring oscillators between which frequencies differ by at least a threshold for setting of input, which is the first threshold. The input value storage unit 14 is included as a parameter holding unit that holds input value data, which is a selectivity parameter that indicates the two ring oscillators found by the searching unit. Furthermore, the first ring oscillator selecting unit 111 and the second ring oscillator selecting unit 112 are included as a selection determining unit that individually determines a ring oscillator indicated by the input value data as a ring oscillator to be selected.

(8) Input Value Reset Determining Unit 16

The input value reset determining unit 16 monitors oscillation frequencies outputted from the first frequency counting unit 121 and the second frequency counting unit 122, and inputs a signal to request to reset of an input value into the input value setting unit 15 when the absolute value of the difference between the frequencies is found to be smaller than the threshold for determining reset of an input value stored in the threshold storage unit 17.

In the second embodiment, the input value reset determining unit 16 included as a difference determining unit that determines whether or not the difference of the frequencies is smaller than the threshold for determining reset of an input value, and also as a resetting unit that causes the selecting unit to execute a selection again.

(9) Threshold Storage Unit 17

The threshold storage unit 17 stores a threshold for setting of input and a threshold for determining reset of an input value. These values are positive. Although these values in the second embodiment are written when the PUF circuit 1 is manufactured, they may be externally written after the circuit is manufactured and may be externally overwritten after being written. Furthermore, it is also possible that any kind of authentication is required for permission of such external overwriting. In the second embodiment, the threshold storage unit 17 is included as a threshold storage unit that stores the threshold for setting of input, which is a first threshold, and the threshold for determining reset of an input value, which is a second threshold.

The operation of the PUF circuit 1 is described below. The operation of the PUF circuit 1 is divided into three processes of "setting of input value data", "calculating an output bit", and "resetting of input value data". They are individually described below.

(Setting of Input Value Data)

Figure 15:
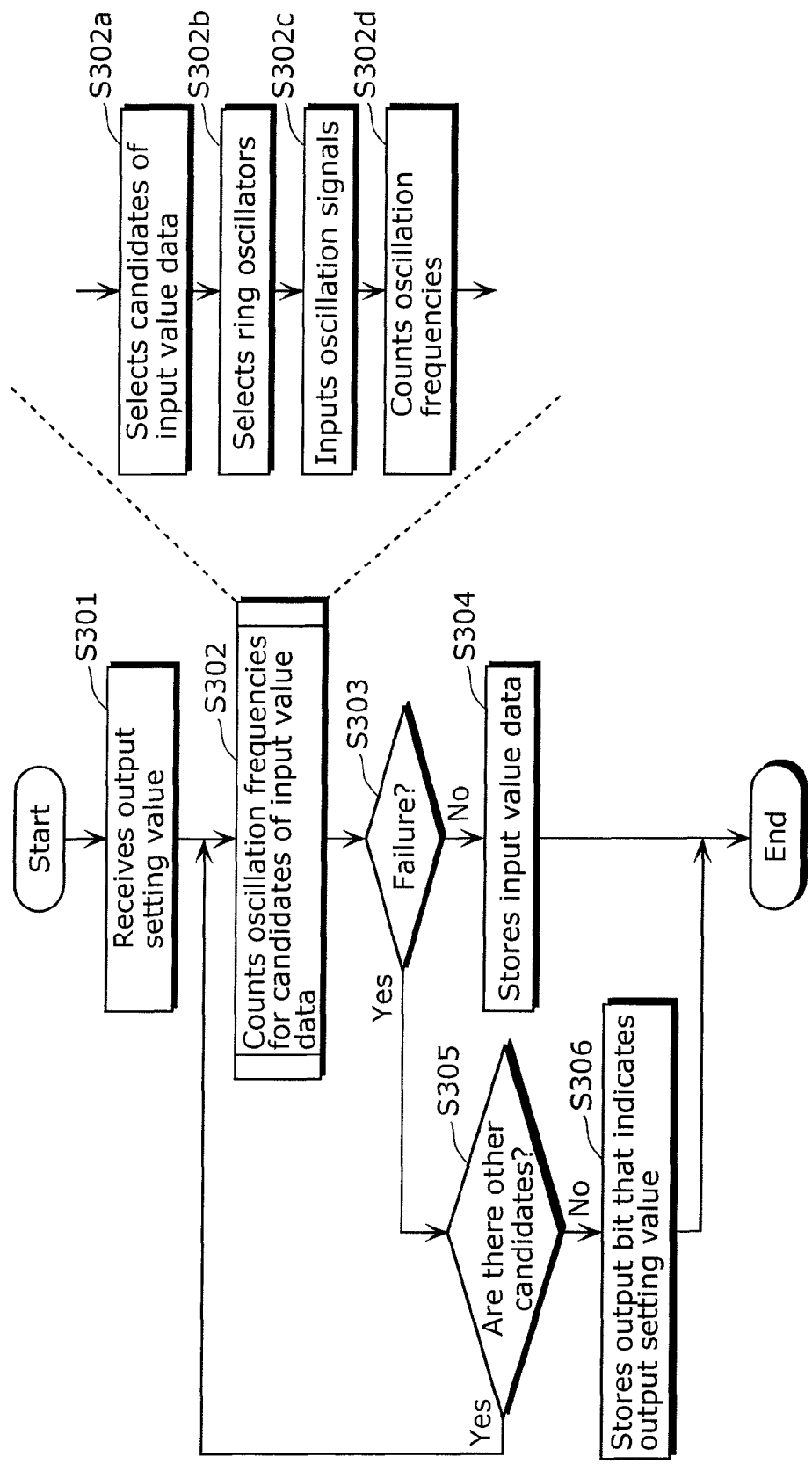
FIG. 15 is a flowchart that shows an operation when the PUF circuit according to the second embodiment sets an input value data.

FIG. 15 is a flowchart that shows an operation when the PUF circuit 1 sets input value data.

The "setting of input value data" is performed as an initialization process after the PUF circuit 1 is manufactured. The process of "setting of input value data" is performed as follows.

Step S301: The input value setting unit 15 receives a one-bit value inputted from outside the PUF circuit 1 as an output setting value. Furthermore, the input value setting unit 15 reads a threshold for setting of input stored in the threshold storage unit 17.

Step S302: The input value setting unit 15 selects candidates of input value data and causes the first frequency counting unit 121 and the second frequency counting unit 122 to count oscillation frequencies for the candidates. Specifically, the input value setting unit 15 selects one number, as a candidate N1 for the first input value data, from 000 (in binary) to 111 (in binary), and selects one number, as a candidate for the second input data item N2, from 000 (in binary) to 111 (in binary). Then, the input value setting unit 15 causes the first frequency counting unit 121 and the second frequency counting unit 122 to count oscillation frequencies of ring oscillators selected according to the combination of (candidate for the first input value data, candidate for the second input value)=(N1, N2 ). The operation of the PUF circuit 1 is described more specifically below.

Step S302a: The input value setting unit 15 generates (N1, N2 ) as candidates of the first and second input value data, and then inputs N1 into the first ring oscillator selecting unit 111 and N2 into the second ring oscillator selecting unit 112.

Step S302b: Subsequently, the first ring oscillator selecting unit 111 selects one ring oscillator from the first to the eighth ring oscillators 101 to 108, according to the N1 and the rule described above. The second ring oscillator selecting unit 112 selects one ring oscillator from the first to the eighth ring oscillators 101 to 108, according to the N2 and the rule described above.

Step S302c: In this step, the selected two ring oscillators oscillate and output oscillation frequencies when the two ring oscillators receive a trigger signal. The ring oscillator selected by the first ring oscillator selecting unit 111 inputs the oscillation signal into the first frequency counting unit 121 via the first ring oscillator selecting unit 111. The ring oscillator selected by the second ring oscillator selecting unit 112 inputs the oscillation signal into the second frequency counting unit 122 via the second ring oscillator selecting unit 112.

Step S302d: The first frequency counting unit 121 and the second frequency counting unit 122 each count a oscillation frequency of the inputted oscillation signal. The first frequency counting unit 121 counts an oscillation frequency F1, and the second frequency counting unit 122 counts an oscillation frequency F2. The counted F1 and F2 are inputted into the input value setting unit 15.

Step S303: The input value setting unit 15 determines whether or not the candidates for the input value data selected according to the oscillation frequencies F1 and F2, which have been counted in the manner mentioned above, are appropriate to be the input value data to be set, in other words, whether or not the candidate selection is a failure. Specifically, the input value setting unit 15 performs D=F2−F1 to obtain a difference D between inputted frequencies F1 and F2 and determines the candidate selection is not a failure when there is no discrepancy between the difference D and the output setting value received in Step S301, and when the absolute value of the difference is equal to or greater than the threshold for setting of input. In this case, as described below for Step S304, the input value setting unit 15 inputs, into the input value storage unit 14, the N1 of the then (N1, N2 ) as the first input value data, and the N2 as the second input value data, and then deletes the output setting value. The condition that "there is no discrepancy between the difference D and the output setting value" means that the difference D is negative or zero when the output setting value is zero, and that the difference D is positive when the output setting value is one. The input value setting unit 15 determines the candidate selection is a failure when the conditions above are not satisfied. In this case, as described below for Step S305, the input value setting unit 15 generates another candidate (N1, N2 ), and Steps S302a through S302d are repeated. In the case where none of the combinations (N1, N2 ) satisfies the conditions above, as described below for Step S306, the input value setting unit 15 inputs an output setting value and a signal to notify a failure of setting of an input value that corresponds to the above-mentioned signal to request to save the output bit into the output bit controlling unit 18, and then deletes the output setting value.

Step S304: The input value storage unit 14 stores N1 and N2, that is, a candidate first input value data and a candidate second input value data which have been determined as not failures and inputted from the input value setting unit 15, as the first input value data and the second input value data to be set, and ends the process of "setting of input value data".

Step S305: The input value setting unit 15 determines whether or not there are candidates other than the candidates N1 and N2 when the selected candidate first input value data N1 and the selected candidate second input value data N2 are determined as failures in Step S303. When determining that there are other candidates, the input value setting unit 15 then repeats the process from Step S302. When determining that there is no other candidate, it executes a process in Step S306.

Step S306: As mentioned above, the input value setting unit 15 outputs an output setting value and a signal to notify a failure of setting of an input value to the output bit controlling unit 18 when it determines that there is no other candidate. Receiving the signal to notify a failure of setting of an input value and the output setting value, the output bit controlling unit 18 inputs the output setting value (an output bit that indicates the output setting bit) to the output bit storage unit 19. The output bit storage unit 19 stores the output setting value, and then ends the process of "setting of input value data".

(Calculating an Output Bit)

Figure 16:
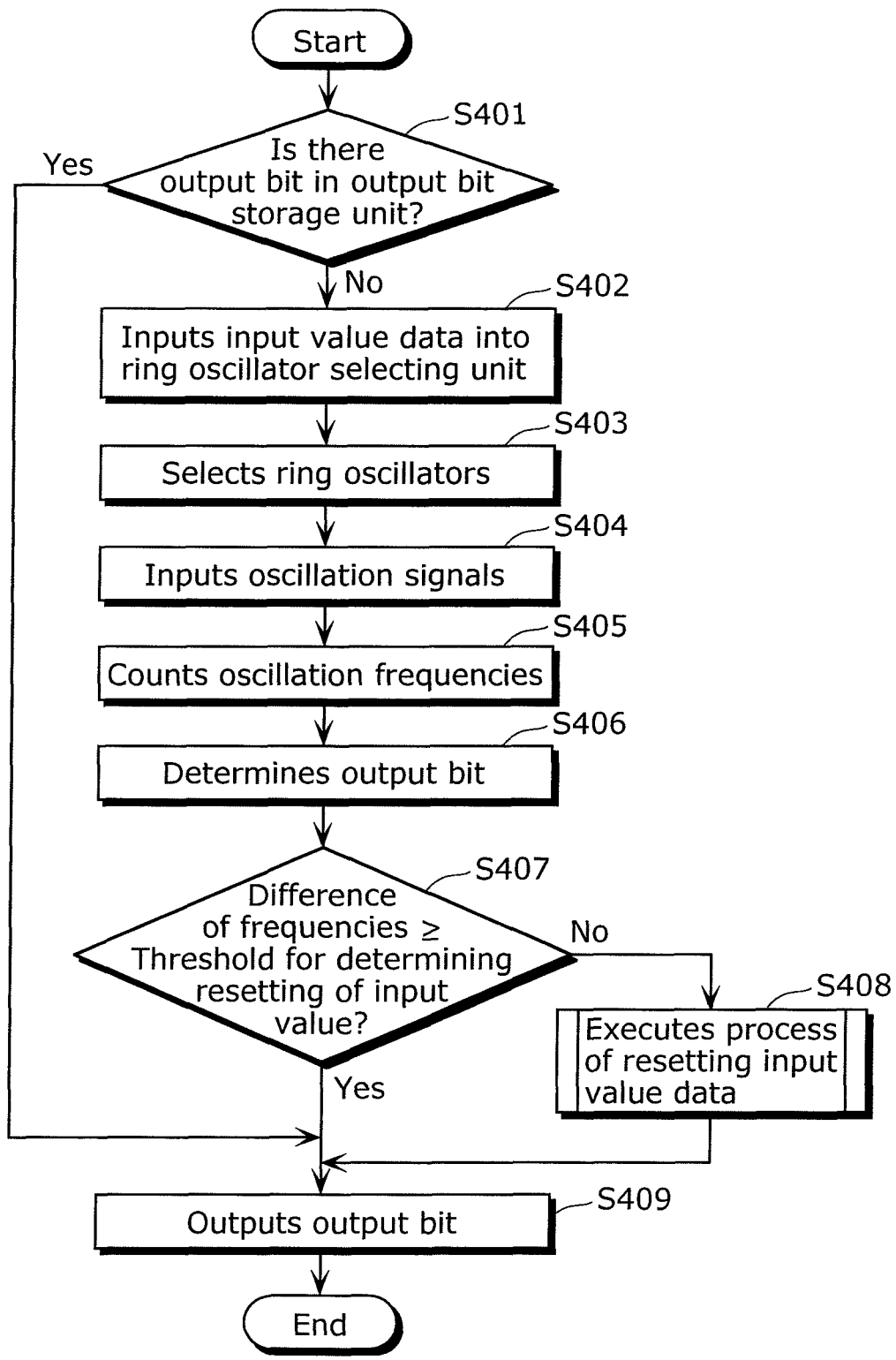
FIG. 16 is a flowchart that shows an operation when the PUF circuit according to the second embodiment calculates an output bit.

FIG. 16 is a flowchart that shows an operation when the PUF circuit 1 calculates an output bit.

The process of "calculating an output bit" is executed when a trigger signal is inputted from outside the PUF circuit 1. Through this process, the PUF circuit 1 outputs a one-bit output bit stored therein to outside the PUF circuit 1. Specifically, the PUF circuit 1 performs the following operation when receiving a trigger signal.

Step S401: The output bit controlling unit 18 checks whether or not the output setting value (the output bit that indicates the output setting bit) is stored in the output bit storage unit 19. When it is stored, the output bit controlling unit 18 outputs the output setting value (one bit) as an output bit from the PUF circuit 1 and ends the process of "calculating an output bit". When no output setting value is stored, the process proceeds to Step S402.

Step S402: The input value storage unit 14 inputs the first input value data stored therein into the first ring oscillator selecting unit 111 and the second input value data into the second ring oscillator selecting unit 112.

Step S403: The first ring oscillator selecting unit 111 selects one of the first to the eighth ring oscillators 101 to 108 according to the first input value data. The second ring oscillator selecting unit 112 selects one of the first to the eighth ring oscillators 101 to 108 according to the second input value data.

Step S404: The two ring oscillators selected in Step S403 each receive a trigger signal, oscillate and output an oscillation signal. Then, the outputted oscillation signals are individually inputted into the first frequency counting unit 121 via the first ring oscillator selecting unit 111, and into the second frequency counting unit 122 via the second ring oscillator selecting unit 112.

Step S405: The first frequency counting unit 121 and the second frequency counting unit 122 count oscillation frequencies F1 and F2 of the oscillation signals being inputted, respectively, and input the counted oscillation frequencies F1 and F2 to the output bit determining unit 13 and the input value reset determining unit 16.

Step S406: The output bit determining unit 13 compares the inputted oscillation frequencies F1 and F2 to find magnitude ordering of them, determines one-bit output bit according to the magnitude ordering the rule for determination mentioned above, and then inputs the one-bit output bit into the output bit controlling unit 18. The output bit controlling unit 18 temporarily stores the inputted output bit.

Step S407: The input value reset determining unit 16 reads the threshold for determining reset of an input value stored in the threshold storage unit 17. Next, the input value reset determining unit 16 performs D=F2−F1 to obtain a difference D between the inputted oscillation frequencies F1 and F2, and checks whether or not the absolute value of the difference D is equal to or greater than the threshold for determining reset of an input value. When it is smaller than the threshold, the input value reset determining unit 16 inputs a signal to request to reset of an input value into the input value setting unit 15. When it is not smaller than the threshold, the input value reset determining unit 16 does nothing.

Step S408: When receiving the signal to request to reset of an input value, the input value setting unit 15 executes a process of resetting the input value data described below. This process causes either "renewal of the first input value data N1 and the second input value data N2 stored in the input value storage unit 14" or "transmission of a signal to notify a failure of resetting an input value to the output bit controlling unit 18".

Step S409: The output bit controlling unit 18 outputs the one-bit output bit, which has been inputted from the output bit determining unit 13 and temporarily stored, as an output bit of the PUF circuit 1. When not receiving the signal to notify a failure of resetting an input value from the input value setting unit 15, the output bit controlling unit 18 ends the calculation of an output bit. When receiving the signal to notify a failure of resetting an input value, the output bit controlling unit 18 further inputs the one-bit output bit into the output bit storage unit 19 as an output setting value. The output bit storage unit 19 stores the output setting value therein and ends the process of "calculating an output bit".

(Resetting of Input Value Data)

Figure 17:
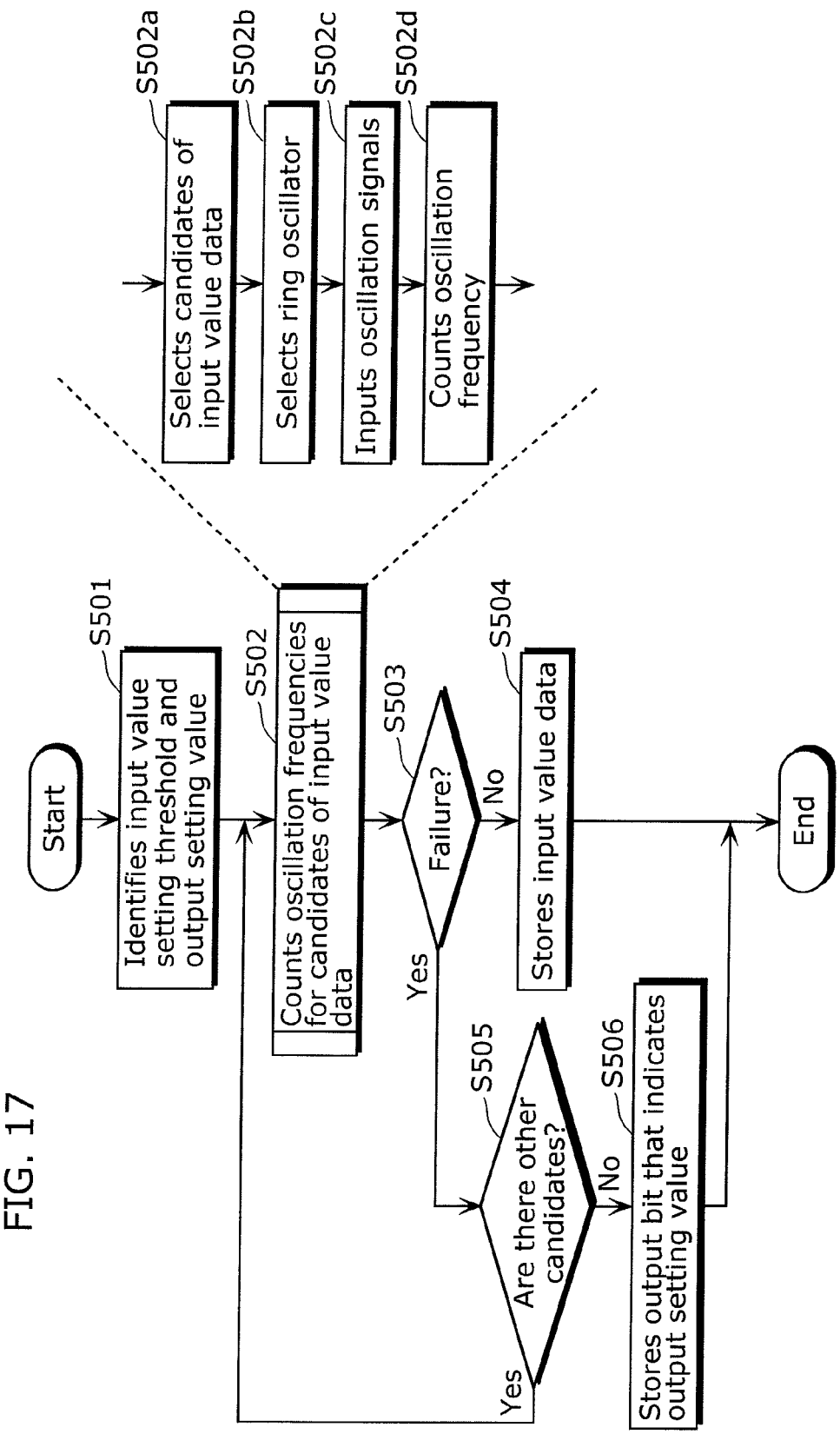
FIG. 17 is a flowchart that shows an operation when the PUF circuit according to the second embodiment resets an input value data.

FIG. 17 is a flowchart that shows an operation when the PUF circuit 1 resets input value data.

The process of "resetting of input value data" is a subroutine process executed when the input value setting unit 15 receives the signal to request to reset of an input value in the process of "calculating an output bit" described above. The process of "resetting of input value data" is performed as follows.

Step S501: The input value setting unit 15 identifies the threshold for setting of input and the output setting value. Specifically, the input value setting unit 15 reads the threshold for setting of input stored in the threshold storage unit 17. Furthermore, the input value setting unit 15 compares the oscillation frequency F1 inputted from the first frequency counting unit 121 and the oscillation frequency F2 inputted from the second frequency counting unit 122 to find magnitude ordering of them in Step S405 of the "calculating an output bit", and then sets the output bit to "1" when F2>F1, otherwise to "0".

Step S502: The input value setting unit 15 selects candidates of input value data and causes the first frequency counting unit 121 and the second frequency counting unit 122 to count oscillation frequencies for the candidates. Specifically, the input value setting unit 15 selects one number, as a candidate N1 for the first input value data, from 000 (in binary) to 111 (in binary), and selects one number, as a candidate for the second input data item N2, from 000 (in binary) to 111 (in binary). Then, the input value setting unit 15 causes the first frequency counting unit 121 and the second frequency counting unit 122 to count oscillation frequencies of ring oscillators selected according to the combination of (candidate for the first input value data, candidate for the second input value)=(N1, N2 ). The operation of the PUF circuit 1 is described more specifically below.

Step S502a: The input value setting unit 15 generates (N1, N2 ) as candidates for the first and second input value data, and then inputs N1 into the first ring oscillator selecting unit 111 and N2 into the second ring oscillator selecting unit 112.

Step S502b: Subsequently, the first ring oscillator selecting unit 111 selects one ring oscillator from the first to the eighth ring oscillators 101 to 108, according to the N1 and the rule described above. The second ring oscillator selecting unit 112 selects one ring oscillator from the first to the eighth ring oscillators 101 to 108, according to the N2 and the rule described above.

Step S502c: In this step, the selected two ring oscillators oscillate and output oscillation frequencies when the two ring oscillators receive a trigger signal. The ring oscillator selected by the first ring oscillator selecting unit 111 inputs the oscillation signal into the first frequency counting unit 121 via the first ring oscillator selecting unit 111. The ring oscillator selected by the second ring oscillator selecting unit 112 inputs the oscillation signal into the second frequency counting unit 122 via the second ring oscillator selecting unit 112.

Step S502d: The first frequency counting unit 121 and the second frequency counting unit 122 each count oscillation frequency of the inputted oscillation signal. The first frequency counting unit 121 counts an oscillation frequency F1, and the second frequency counting unit 122 counts an oscillation frequency F2. The counted F1 and F2 are inputted into the input value setting unit 15.

Step S503: The input value setting unit 15 determines whether or not the candidates for the input value data selected according to the oscillation frequencies F1 and F2, which have been counted in the manner mentioned above, are appropriate to be the input value data to be set, in other words, whether or not the candidate selection is a failure. Specifically, the input value setting unit 15 performs D=F2−F1 to obtain a difference D between frequencies F1 and F2 and determines the candidate selection is not a failure when there is no discrepancy between the difference D and the output setting value identified in Step S501, and when the absolute value of the difference is equal to or greater than the threshold for setting of input. In this case, as described below for Step S504, the input value setting unit 15 inputs, into the input value storage unit 14, the N1 of the then (N1, N2) as the first input value data, and the N2 as the second input value data, and then deletes the output setting value. The condition that "there is no discrepancy between the difference D and the output setting value" means that the difference D is negative or zero when the output setting value is zero, and that the difference D is positive when the output setting value is one. The input value setting unit 15 determines the candidate selection is a failure when the conditions above are not satisfied. In this case, as described below for Step S505, the input value setting unit 15 generates another candidate (N1, N2), and Steps S502a through S502d are repeated. In the case where none of the combinations (N1, N2) satisfies the conditions above that is based on the threshold for setting of input, as described below for Step S506, the input value setting unit 15 inputs an output setting value and a signal to notify a failure of resetting an input value that corresponds to the above-mentioned signal to request to save the output bit into the output bit controlling unit 18. The, the input value setting unit 15 deletes the output setting value.

Step S504: The input value storage unit 14 stores N1 and N2, that is, a candidate first input value data and a candidate second input value data which have been determined as not failures and inputted from the input value setting unit 15, as the first input value data and the second input value data to be set, and ends the process of "resetting of input value data".

Step S505: The input value setting unit 15 determines whether or not there are candidates other than the candidates N1 and N2 when the selected candidate first input value data N1 and the selected candidate second input value data N2 are determined as failures in Step S503. When determining that there are other candidates, the input value setting unit 15 then repeats the process from Step S502. When determining that there is no other candidate, it executes a process in Step S506.

Step S506: As mentioned above, the input value setting unit 15 outputs an input setting value and a signal to notify a failure of resetting an input value to the output bit controlling unit 18 when it determines that there is no other candidate. Receiving the signal to notify a failure of resetting an input value and the output setting value, the output bit controlling unit 18 inputs the output setting value to the output bit storage unit 19. The output bit storage unit 19 stores the output setting value, and then ends the process of "resetting of input value data".

(Overview of Operation of PUF Circuit 1)

On the basis of the operations described above, the operation of the PUF circuit 1 according to the second embodiment is described below.

After being manufactured, the PUF circuit 1 executes the process of "setting of input value data" and sets an output bit of one or zero. Following this, the PUF circuit 1 executes the process of "calculating an output bit", and outputs an one-bit output bit set through the process of the "setting of input value data". When detecting that the difference between frequencies of the two ring oscillators, which has been selected according to the input value data (N1, N2) set in the input value storage unit 14, is smaller than a predetermined threshold due to reasons such as change with age, the PUF circuit 1 executes the process of "resetting of input value data" to reset the input value data.

In the second embodiment, the input value data is reset so that the difference between frequencies of two ring oscillators, which have been selected according to the set input value data, is equal to or greater than a predetermined threshold due to change with age in frequency characteristics of circuits included in the ring oscillators when the difference is detected to be smaller than the predetermined threshold. In contrast, conventional PUF circuits do not have mechanisms to reset input data values when the difference between frequencies of ring oscillators is small due to change with age or when it is probable that the magnitude ordering of the frequencies is reversed due to change in external environment. The PUF circuit 1 has a configuration that provides output bits with more stability against change with age in frequency characteristics than such conventional ones.

Furthermore, in the second embodiment, two values of the threshold for setting of input and the threshold for determining reset of an input value are used and stored in the threshold storage unit 17. Conventionally, these values are not stored in PUF circuits. However, these values are mere thresholds of the absolute value of a difference between frequencies of ring oscillators, and the values do not suggest magnitude ordering of oscillation frequencies from ring oscillators selected in the process of calculating output bits. In other words, one-bit output bits cannot be supposed using these values, so that the PUF circuit 1 according to the second embodiment can hold secret data as securely as conventional PUF circuits.

Furthermore, in the case where, in the process of resetting value data, the frequency characteristics of the ring oscillators have changed with age so much that no pair of ring oscillators are found that have a frequency difference therebetween equal to or greater than a predetermined threshold, output bits are stored in the output bit storage unit 19, and thereafter the PUF circuit 1 outputs the output bits stored in the output bit storage unit 19. This retains the stability of output bits by outputting the same output bits when it is determined that keeping output of output bits stable longer with the configuration of the PUF is difficult. In this case, output bits are less secure than when they are stored in the PUF. However, even when only one bit out of tens to hundreds bits of a key data is analyzed and revealed, it rarely leads to fatal safety deterioration. Accordingly, there is no substantial, significant security problem. This technique may be omitted when a highly secure PUF circuit is to be implemented.

As described above, when the PUF circuit according to the second embodiment detects that a frequency difference between ring oscillators is smaller than a predetermined threshold, it resets input value data so that the frequency difference between selected ring oscillators is greater than the threshold. This increases stability of output bits from the PUF circuit against change with age in frequency characteristics of the ring oscillators. In other words, an information security apparatus is provided with a PUF circuit in which output bits are not inverted by change with age.

(Third Embodiment)

Hereinafter, the third embodiment of the present invention is described with reference to figures. In the third embodiment, an error is detected or corrected using an error correcting code. The process of resetting input value data is executed using a result of the error detection or the error correction with the configuration of the second embodiment. This further increases stability of output bits from the PUF circuit against change with age in frequency.

(Configuration of PUF Circuit 4)

Figure 18:
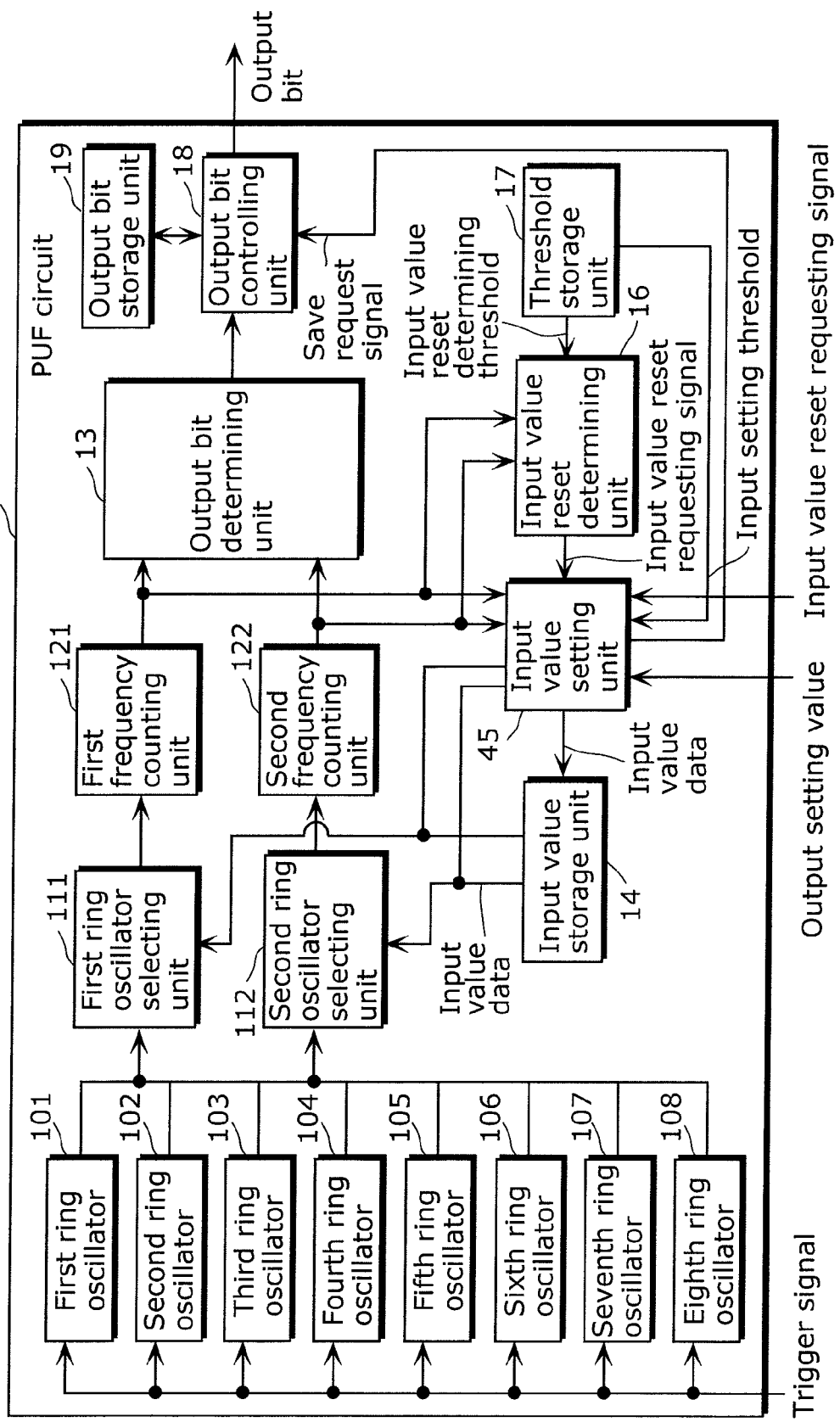
FIG. 18 is a block diagram that shows a configuration of a PUF circuit according to the third embodiment of the present invention.

FIG. 18 is a block diagram showing an exemplary internal configuration of a PUF circuit 4 according to the third embodiment. The PUF circuit 4 corresponds to the first PUFs 11041A to 11041I in the first embodiment and a variation thereof. The configuration of the PUF circuit 4 is almost the same as that of the PUF circuit 1 shown in FIG. 13 for the second embodiment. Specifically, the PUF circuit 4 includes first to eighth ring oscillators 101 to 108, first and second ring oscillator selecting units 111 and 112, first and second frequency counting unit 121 and 122, an output bit determining unit 13, an input value storage unit 14, an input value setting unit 45, an input value reset determining unit 16, a threshold storage unit 17, an output bit controlling unit 18, and an output bit storage unit 19.

The only difference from the PUF circuit 1 is that an signal to request to reset of an input value is externally inputted into the PUF circuit 4 and received by the input value setting unit 45. In other words, the input value setting unit 45 according to the third embodiment not only functions similarly to the input setting unit 15 in the second embodiment but also executes the process of "resetting the input value data" in the second embodiment when receiving a signal to request to reset of an input value from outside the PUF circuit 4 as well as when receiving a signal to request to reset an input value from the input value reset determining unit 16.

The information generating PUF unit according to the third embodiment includes nine of such PUF circuits 4 to hold a hash key, which is three-bit secret data, securely.

Figure 19:
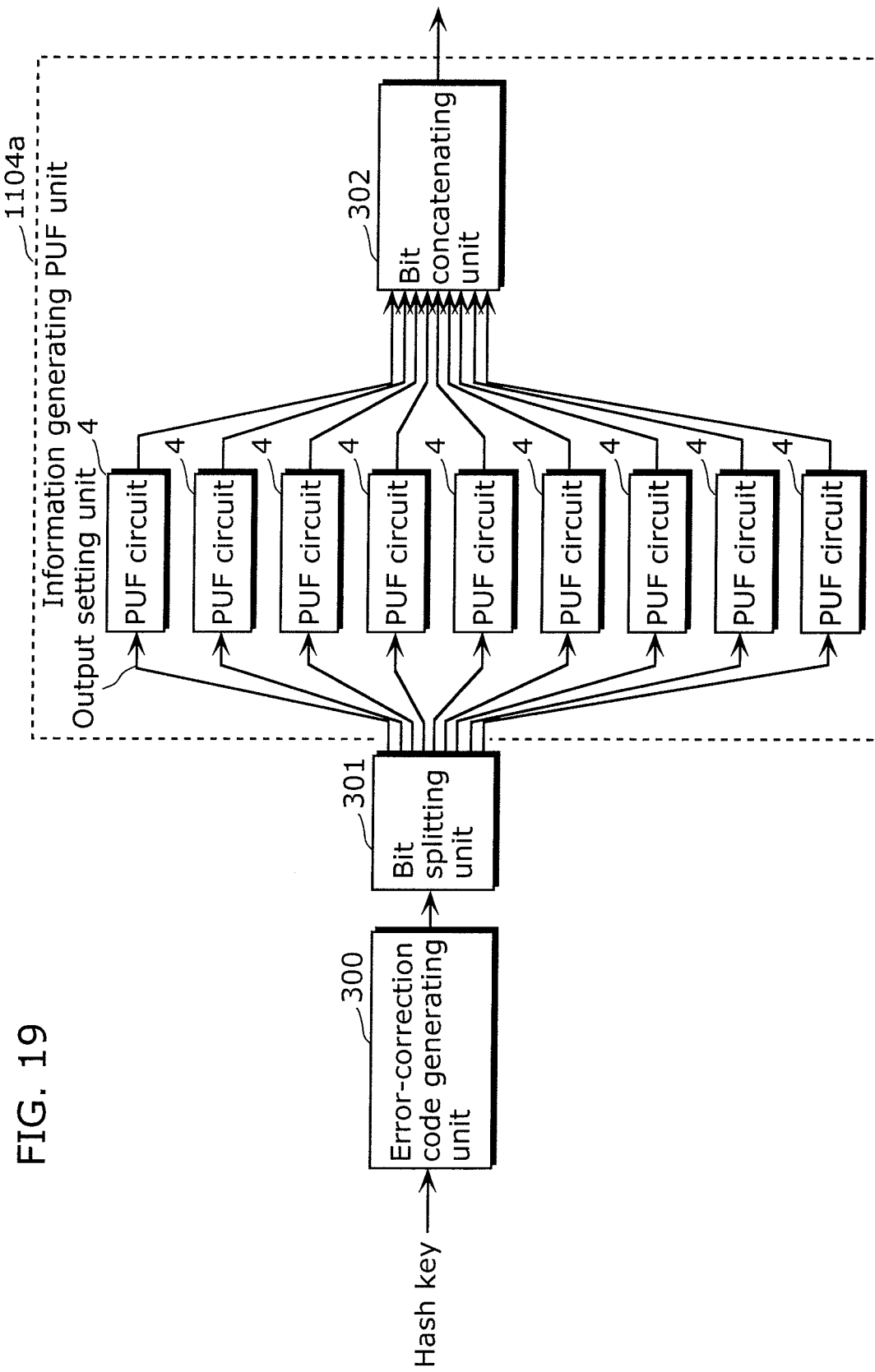
FIG. 19 shows how a hash key is set in an information generating PUF unit according to the third embodiment.

FIG. 19 shows how a hash key is set in the information generating PUF unit according to the third embodiment.

The information generating PUF unit 1104a includes nine PUF circuits 4 and a bit concatenating unit 302 that concatenates output bits outputted from the nine PUF circuits 4. The bit concatenating unit 302 functions similarly to the hash key generating unit 11042 in the first embodiment. When a three-bit hash key is set in the information generating PUF unit 1104a, an error-correction code generating unit 300 and a bit splitting unit 301 are used. A process of setting a hash key is executed in a state where no hash key has not been set after the information generating PUF unit 1104a is manufactured.

The error-correction code generating unit 300 generates an error-correction code of a hash key through error-correction coding of a three-bit hash key. The bit splitting unit 301 splits the error-correction code generated by the error-correction code generating unit 300 on a bit basis. The resulting bits are each inputted as output setting value into respective PUF circuits 4. The setting process of a hash key is described using a specific example below.

First, a hash key M is inputted into the error-correction code generating unit 300. The error-correction code generating unit 300 generates an error-correction code (error-correction code word C) of the hash key M as follows. The hash key M is assumed to be (m1, m2, m3). Each of the m1, m2, and m3 is a value of one bit. The m1 is the most significant bit of M, the m2 is the second, and the m3 is the least significant bit. Here, the error-correction code generating unit 300 determines an error-correction code word C is a nine bit value: C=(m1, m1, m1, m2, m2, m2, m3, m3, m3 ). For example, when M=101 (in binary), C=111000111 (in binary). When M=011 (in binary), C=000111111 (in binary). The error-correction code generating unit 300 inputs the resulting nine-bit error-correction code word C into the bit splitting unit 301. The bit splitting unit 301 splits the inputted nine-bit C on a bit-by-bit basis and inputs each of the bits into the respective nine PUF circuits 4. The nine PUF circuits 4 each receive the inputted one-bit data as a output setting value and executes exactly the same process of "setting input value data" of the PUF circuit 1 in the second embodiment.

Figure 20:
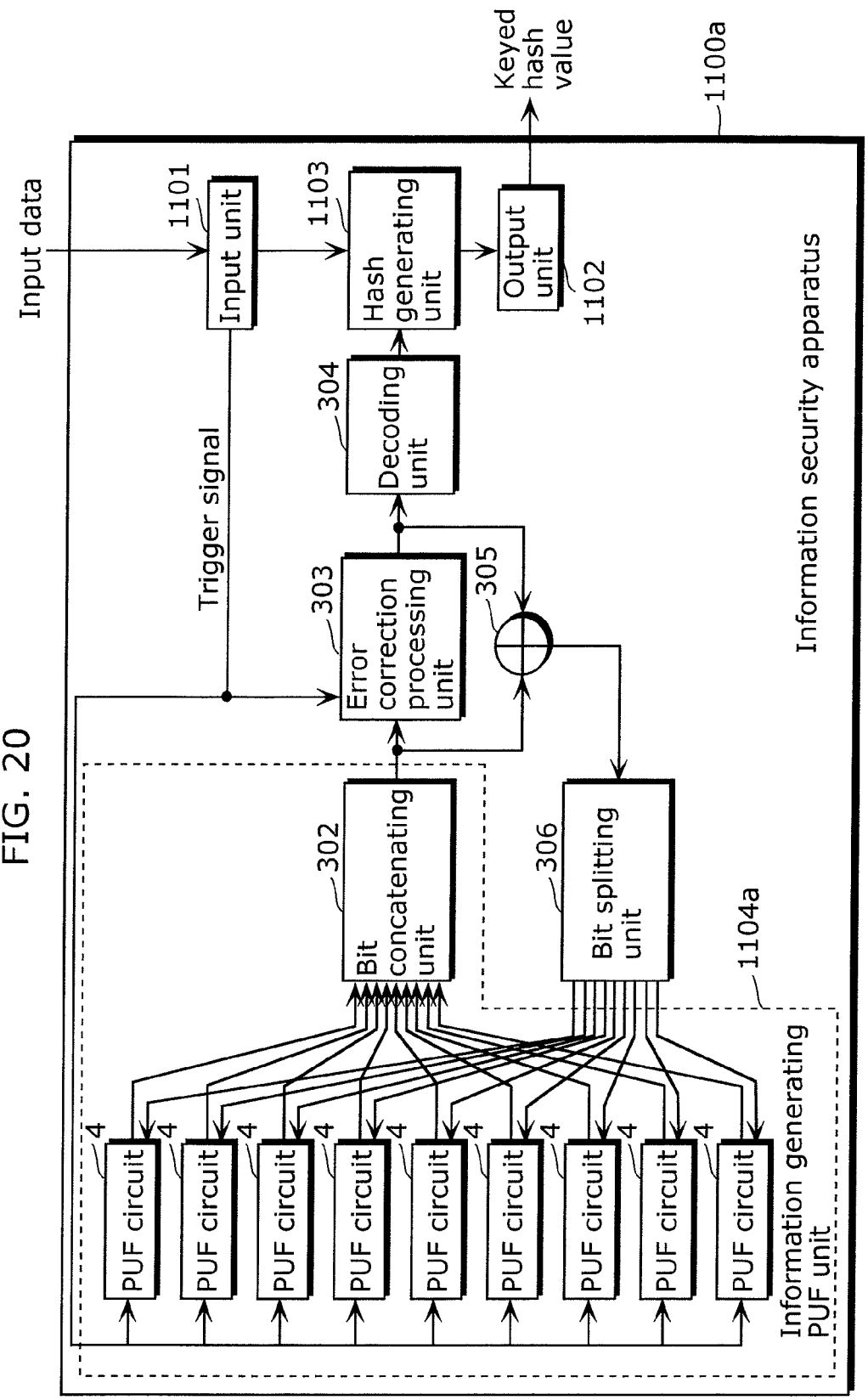
FIG. 20 shows a configuration of an information security apparatus according to the third embodiment.

FIG. 20 shows a configuration of an information security apparatus according to the third embodiment.

The information security apparatus 1100a according to the third embodiment includes an information generating PUF unit 1104a, an error correction processing unit 303, an XOR unit 305, a bit splitting unit 306, a decoding unit 304, an input unit 1101, a hash generating unit 1103, and an output unit 1102. The input unit 1101, the hash generating unit 1103, and the output unit 1102 according to the third embodiment are identical to the input unit 1101, the hash generating unit 1103, and the output unit 1102 of the information security apparatus 1100 in the first embodiment, respectively.

When a trigger signal is inputted into the nine PUF circuits 4 of the information generating PUF unit 1104a, each of the PUF circuits 4 executes the same process as "calculating an output bit" in the second embodiment and outputs one-bit output bit. In order to generate a pre-error-correction hash key as nine-bit data, the bit concatenating unit 302 concatenates bits on the basis of the order of the nine PUF circuits 4 so that an output bit from the first PUF circuit 4 becomes the most significant bit and an output bit from the ninth PUF circuit 4 becomes the least significant bit. The bit concatenating unit 302 then inputs the generated hash key into the error correction processing unit 303 and the XOR unit 305. In the third embodiment, the bit concatenating unit 302 is included as a concatenating unit that concatenates output values outputted from the plurality of PUF circuits 4.

The error correction processing unit 303 performs an error correction on the inputted nine-bit data and outputs resulting nine-bit data.

Figure 21:
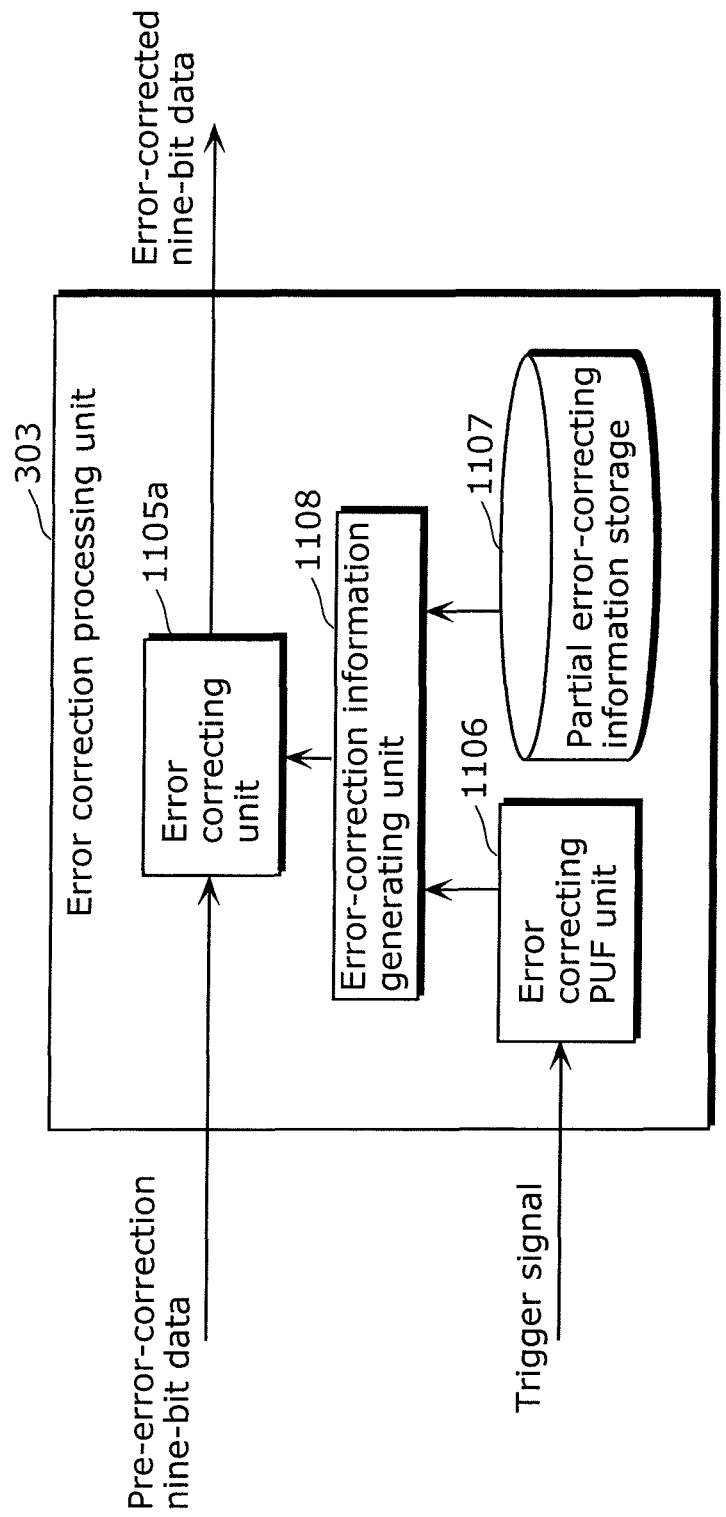
FIG. 21 shows a configuration of an error-correction information processing unit according to the third embodiment.

FIG. 21 shows a configuration of the error correction processing unit 303.

The error correction processing unit 303 includes an error correcting unit 1105a, an error-correction information generating unit 1108, an error correcting PUF unit 1106, and a partial error-correction information storage unit 1107. The error-correction information generating unit 1108, the error correcting PUF unit 1106, and the partial error-correction information storage unit 1107 according to the third embodiment are identical to the error-correction information generating unit 1108, the error correcting PUF unit 1106, and the partial error-correction information storage unit 1107 in the first embodiment, respectively.

The error correcting unit 1105a according to the third embodiment performs an XOR operation as the error correcting unit 1105 in the first embodiment does, but does not decode a three-bit repetition code into a one-bit one. The error correcting unit 1105a XORs nine bit data that is a pre-error-correction hash key and error-correction information, and inputs a resulting nine-bit data into the decoding unit 304 and the XOR unit 305.

The decoding unit 304 divides the nine-bit data inputted from the error correction processing unit 303 into three-bit repetition codes and decodes the three-bit repetition codes into one-bit codes. In other words, a combination of the error correcting unit 1105a and the decoding unit 304 according to the third embodiment is parallel to the error correcting unit 1105 in the first embodiment.

Specifically, the decoding unit 304 eliminates redundancy added for the purpose of error-correction coding from inputted error-corrected nine-bit data and outputs a corrected three-bit hash key. To be more specific, the decoding unit 304 divides the nine-bit data into three-bit data items from the most significant three bits. The decoding unit 304 then converts each three-bit data items, such as 000 (in binary) into 0 (in binary) and 111 (in binary) into 1 (in binary), and concatenates resulting bits to make three-bit data. This provides data identical to the three bits of the hash key set in each of the PUF circuits 4 in the process of "setting of input value data". The error-correction codes used as described above are repetition codes in which one information bit is followed by two bits of the same value as that of the information bit. An error that has occurred in one of the three bits (one-bit information bit and two-bit redundant bits) and inverted the bit may be detected and corrected.

The error correction processing unit 303 may perform an error correction as follows. The error correction processing unit 303 divides inputted nine-bit data into three-bit data items c1, c2, and c3, from the most significant three bits. Next, the error correction processing unit 303 calculates a Hamming weight (number of bits with a value of 1) for each of c1, c2, and c3. When the Hamming weight is two or more, the data item is interpreted as 111 (in binary). When it is one or less, the data item is interpreted as 000 (in binary). For example, a data item 010 (in binary) is interpreted as 000 (in binary), and 110 (in binary) as 111 (in binary). The error correction processing unit 303 then concatenates resulting three three-bit data items in the order of significance, results of error correction processes for c1, c2, and c3, and inputs the concatenated data as nine-bit data, which is a final result of the error correction, into the decoding unit 304 and the XOR unit 305.

The XOR unit 305 XORs the pre-error-correction nine-bit data inputted from the bit concatenating unit 302 and the nine-bit data inputted from the error correction processing unit 303, and then inputs resulting nine-bit data into the bit splitting unit 306. This is equivalent to comparing data before an error correction and data after the error correction and indicating a location of a bit on which the error correction is performed using 1. In other words, the XOR unit 305 according to the third embodiment is included as an error-determining unit that determines whether or not an error has been occurred in a hash key outputted from the information generating PUF unit 1104a.

The bit splitting unit 306 splits the inputted nine-bit data on a bit-by-bit basis from the most significant bit and inputs each of the bits into the PUF circuits 4. Thus, one-bit data "1" is inputted as a signal to request to reset of an input value into the PUF circuit 4 that has outputted a bit on which an error correction has been performed, and one-bit data "0" is inputted into the PUF circuit 4 that has outputted a bit on which an error correction has not been performed. In other words, the bit splitting unit 306 according to the third embodiment is included as a reset-requesting unit that requests the information generating PUF unit 1104a for resetting of a hash key.

The PUF circuit 4 which has received the signal to request to reset of an input value executes the process of "resetting input value data" as in the second embodiment above. In other words, the PUF circuit 4 executes the process described above with reference to FIG. 17. However, when the input value setting unit 45 of the PUF circuit 4 specifies an output setting value in Step S501, the input value follows a rule opposite to the rule described above because an error has occurred in an output bit. For example, the input value setting unit 45 compares the oscillation frequency F1 inputted from the first frequency counting unit 121 and the oscillation frequency F2 inputted from the second frequency counting unit 122 to find magnitude ordering of them, and sets an output setting value to "1" when $F2 \leq F1$, otherwise to "0".

The input value setting unit 45 of the PUF circuit 4 according to the third embodiment is included as a resetting unit that resets a hash key.

A feature of the third embodiment is that a PUF circuit that has generated a bit value for which an occurrence of an error has been detected (error correction has been performed) is instructed to execute a process of resetting input value data. This provides an advantageous effect that cannot be achieved in the second embodiment. For example, in the case where frequency characteristics of ring oscillators have rapidly changed in the configuration of the second embodiment, an output bit from a PUF circuit is inverted when an original status $F2-F1>R$ changes to a status $F2-F1<-R$, where R denotes the threshold for determining reset of an input value and $F2-F1$ denotes a difference between oscillation frequencies. In this case, since the absolute value of the $F2-F1$ is greater than R, the input value is not reset. However, in the third embodiment, such inversion of the output bit is detected and the input value is reset; thus, an appropriately reset input value is provided. As described above, in the third embodiment, input values are appropriately reset even in the case of rapid change in frequency characteristics of ring oscillators so that stability of output bits is maintained.

Although a PUF circuit 4 that has outputted an output bit in which an error has occurred, that is, a PUF circuit 4 that has received a signal to request to reset of an input value, resets an input value data in the third embodiment, it is also possible that the PUF circuit stores a value of an output bit to be outputted, that is, a output setting value in the output bit storage unit 19 without resetting an input value.

Figure 22:
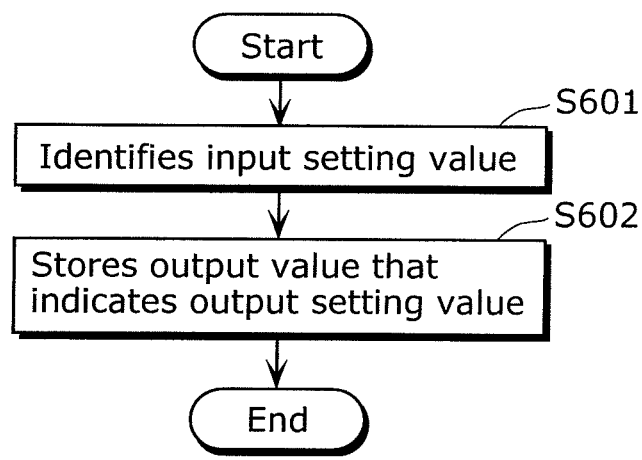
FIG. 22 shows a different operation of a PUF circuit according to the third embodiment.

FIG. 22 is a flowchart that shows a different operation when the PUF circuit 4 that has received a signal to request to reset of an input value.

First, the input value setting unit 45 that has received a signal to request to reset of an input value identifies an output setting value (Step S601). In this case, since an error has occurred in an output bit as in the case above, the input value setting unit 45 compares the oscillation frequency F1 inputted from the first frequency counting unit 121 and the oscillation frequency F2 inputted from the second frequency counting unit 122 to find magnitude ordering of them, and sets the output setting value to "1" when $F2 \leq F1$, otherwise to "0".

Then, the input value setting unit 45 outputs the identified output setting value and a signal to request saving into the output bit controlling unit 18 and causes the output bit controlling unit 18 to store the output setting value (an output bit that indicates the output setting value) in the output bit storage unit 19 (Step S602).

The PUF circuit 4 has fewer burdens of subsequent processes and outputs output bits with stability as described above when the PUF circuit 4 which has received the signal to request to reset of an input value does not reset input value data and the output setting value is stored in the output bit storage unit 19.

(Variations)

The first to the third embodiments described above are illustrative embodiments of the present invention. The present invention is not limited these embodiments and may also be implemented in various embodiments that are within the spirit and scope of the present invention. For example, the following are also included in the present invention.

(1) The error-correction code to be used in the information security apparatus or the error-correction information generating unit is not limited to repetition codes. Any kind of error-correction code is applicable. For example, algebraic codes such as the Reed-Solomon code or a convolutional code is applicable. The code length (the number of bits or elements) is not limited to nine, and the number of information symbol is not limited to three. In terms of security, corrected hash keys are preferably 80 bits or more in length.

(2) The information security apparatus may output conversion data, which is input data converted using a secret key, instead of a keyed hash value. Conversion data includes encrypted text, decrypted text, and signed data as well as the keyed hash value.

(3) The information security apparatus may use a tamper-resistant circuit that is capable of outputting secret information instead a PUF circuit. A tamper-resistant circuit with output that varies due to environment or aging degradation is also applicable. It is also possible to use an identifying information generating circuit, which is disclosed in Patent Reference 2 (Japanese Unexamined Patent Application Publication No. 2006-060109), as a tamper-resistant circuit. The identifying information generating circuit generates a unique identification code from a first logic signal outputted from a flip-flop or respective memory cells of a RAM or a static RAM when they are energized. PUFs applicable to the present invention include an optical PUF which utilizes a speckle pattern, a silicon PUF which utilizes gate delay, a coating PUF which utilizes dielectric performance, and an acoustic PUF which utilizes acoustic noise.

(4) The environment changing unit of the error-correction information generating unit may change not ambient temperature of the PUF circuit but cause other environmental change such as change in voltage. It is also possible that this unit acquires current environment and inform the environmental change analyzing unit about the current environment instead of change in the environment.

(5) Although the second PUF circuit is provided with the pre-fixed rule for converting differences to values of "0" to "7", the rule may be made by the error-correction information generating unit, and then embedded in the second PUF circuit or stored in the partial error-correction information storage unit. It is also possible that the partial error-correction information storage unit stores the error-correction information of the second PUF circuit. In this case, attackers may find out error-correcting PUF information using error-correction information in the second PUF circuit and also find out error-correction information of the first PUF circuit using the partial error-correction information. However, this is still effective for enhancing safety because it increases workload for analysis by attackers. Additionally, it is also possible to add third, fourth . . . PUF circuits in order to make it more difficult for attackers to find out the error-correction information.

(6) Although output bits of one bit or three bits are determined by the magnitude ordering of oscillation frequencies of two ring oscillators in the embodiments above, the number of the ring oscillators is not limited to two but may also be three or more. For example, when frequencies of three ring oscillators are A, B, and C, all required is to determine correspondence between all the patterns of magnitude ordering among A, B, and C and output bits as a rule in advance. The input value reset determining unit then determines an input value by arranging A, B, and C in descending order of magnitude of frequencies and calculating a difference between (the highest frequency) and (the second highest frequency) and a difference between (the second highest frequency) and (the third highest frequency) to check whether or not these differences are greater than a predetermined threshold.

(7) In the embodiments above, when a pair of input values (N1, N2) are found to have a difference therebetween greater than a signal to notify a failure of setting of an input value, the pair are set or reset in the input value storage unit in the processes of "setting input value data" and "resetting input value data". It is also possible that frequency differences between all the pairs of input values (N1, N2) are calculated, and a pair of (N1, N2) with the greatest difference therebetween is selected. In this case, the input values of the selected pair are set or reset in the input value storage unit when the difference is greater than the threshold for setting an input value, and a signal to notify a failure of setting of an input value signal or a signal to notify a failure of resetting of an input value is transmitted when the difference is greater than the threshold.

(8) It is not necessary to set the threshold for setting of input and the threshold for determining reset of an input value to be stored in the threshold storage unit at time of manufacture of the PUF circuit. It may be set after the time of manufacture. They may also be reset after being set. Specifically, only either of the threshold for setting of input or the threshold for determining reset of an input value may be updated. For example, these thresholds may be changed whenever a PUF circuit executes the process of calculating an output bit for a predetermined times. It is also possible that these thresholds are reduced when no pair of ring oscillators satisfies a currently set threshold for setting of input.

(9) It is not necessary that the input value reset determining unit determines resetting of an input value for every execution of the process of calculating an output bit. This determination may be performed after every predetermined times of the process of calculating an output bit or may be performed when the input value reset determining unit receives an external instruction signal.

(10) Although ring oscillators are used as oscillation circuits in the configurations of the embodiments above, any kind of oscillation circuits, such as oscillation circuits using solid oscillators, CR oscillation circuits, LC feedback oscillation circuits, may be used instead.

(11) Although the data outputted from one PUF circuit is of one bit or three bits, the data may be of not one bit or three bit but of two bits, 4 bits or larger as long as a rule for determining output bits on the basis of the magnitude ordering of oscillation frequencies is made in advance.

(12) Each of the apparatuses described above is a computer system including a microprocessor, a ROM, a RAM, a hard disc unit, a display unit, a keyboard, a mouse, etc. A computer program is stored in the RAM or the hard disk unit. The respective apparatuses achieve their functions through the operation of microprocessor according to the computer program. Here, the computer program includes a combination of instruction codes sending an instruction to the computer in order to achieve a predetermined function.

(13) All or some of the components included in the respective apparatuses above may be a system Large Scale Integration (LSI). The system LSI is a super-multi-functional LSI manufactured by integrating constituent units on one chip, and is specifically a computer system configured by including a microprocessor, a ROM, a RAM, etc. A computer program is stored in the RAM. The system LSI achieves its function through operation of the microprocessor according to the computer program.

(14) All or some of the components included in the respective apparatuses above may be an integrated circuit (IC) card or a unit of a module that are attachable to the respective apparatuses. For example, the whole of the information security apparatus 1100 shown in FIG. 4 may be included in an IC card, or the information generating PUF unit 1104, the error correcting unit 1105, the error-correction information generating unit 1108, the error correcting PUF unit 1106, and the partial error-correction information storage unit 1107 of the information security apparatus 1100 may be included in an IC card. The IC card or the module is a computer system composed of a microprocessor, a ROM, a RAM, etc. The IC card or the module may include the super-multi-functional LSI mentioned above. The IC card or the module achieves the function thereof through operation of the micro processor according to the computer program. The IC card or the module may also be implemented to be tamper-resistant.

(15) The present invention may also be methods described above. The present invention may also be a computer program that executes the methods on a computer, or a digital signal including the computer program.

(16) The present invention may also be the computer program or the digital signal recorded on a computer-readable recording medium, such as a flexible disc, a hard disc, a CD-ROM, an MO, a DVD, a DVD-ROM, a DVD-RAM, Blu-ray Disc (BD), a semiconductor memory, or the like. The present invention may also be the digital signal recorded on these recording media.

(17) The present invention may also be the computer program or the digital signal transmitted via an electric telecommunication line, wire or wireless communication line, a network represented by the Internet, or data broadcasting.

(18) The present invention may also be embodied as a computer system including a micro processor and a memory, where the memory stores the computer program, and the microprocessor operates according to the computer program.

(19) The program or the digital signal may also be recorded on the recording medium and transmitted, or transmitted via the network to be executed on a different independent computer system.

(20) The first to the third embodiments and the variations above may be selected and combined to be executed.

Industrial Applicability

The information security apparatus according to the present invention has an advantageous effect of avoiding safety deterioration of a PUF by preventing attackers, even who may use information stored in memory, from finding out secret data such as key values concealed by the PUF and is applicable to IC cards, for example. Furthermore, because of features that secret data such as key data and ID data is kept securely and inexpensively and that stability of the secret data against change with age is improved, the information security apparatus according to the present invention is applicable as an information security apparatus required to achieve high security, low cost, and high stability.

The invention claimed is:

1. An information security apparatus that outputs preset secret data, said information security apparatus comprising:
   a first tamper-resistant circuit having tamper resistance and set, using physical characteristics, so as to output predetermined secret data;
   a correction data storage unit configured to store first correction data;
   a second tamper-resistant circuit having tamper resistance and set, using physical characteristics, so as to output second correction data;
   a correction information generating unit configured to generate error-correction information using the first correction data and the second correction data, the first correction data being stored in said correction data storage unit and the second correction data being outputted from said second tamper-resistant circuit; and
   an error correcting unit configured to perform an error correction, using the error-correction information generated by said correction information generating unit, on secret data outputted from said first tamper-resistant circuit, and to output the error-corrected secret data,
   wherein the predetermined secret data preset for said first tamper-resistant circuit and the second correction data preset for said second tamper-resistant circuit are set using a Physically Unclonable Function (PUF),
   wherein when ambient environment around said first tamper-resistant circuit and the said second tamper-resistant circuit is changed, the first correction data stored in said correction data storage unit is generated based on (i) an output value outputted from said first tamper-resistant circuit and (ii) an output value outputted from said second tamper-resistant circuit, the output values being outputted from said first tamper-resistant circuit and said second tamper-resistant circuit which are in the ambient environment after being changed, and
   wherein said correction information generating unit is configured to generate the error-correction information by coding the second correction data using a predetermined method and XORing the coded second correction data and the first correction data.

2. The information security apparatus according to claim 1, further comprising:
   a receiving unit configured to receive input data; and
   an encrypting unit configured to encrypt the input data using the error-corrected secret data outputted from said error correcting unit as a key.

3. The information security apparatus according to claim 1, wherein said first tamper-resistant circuit includes at least one first PUF circuit that outputs a one-bit value as at least a part of the predetermined secret data, and
   wherein said second tamper-resistant circuit includes at least one second PUF circuit that outputs a value of at least two bits as at least a part of the second correction data.

4. The information security apparatus according to claim 1, wherein said first tamper-resistant circuit includes at least one first PUF circuit that includes:
   N oscillation units each configured to output an oscillation signal, where $N \geq 2$;
   a selecting unit configured to select M oscillation units from said N oscillation units, where $M \leq N$; and
   a determining unit configured to determine an output value according to a magnitude ordering of frequencies of oscillation signals outputted from said M oscillation units selected by said selecting unit, and to output the determined output value, and
   wherein said selecting unit is configured to select said M oscillation units so that the output value determined by said determining unit indicates at least a part of the predetermined secret data.

5. The information security apparatus according to claim 4, wherein said selecting unit is configured to select said M oscillation units so that a difference of the frequencies between the oscillation signals outputted from said M oscillation units is equal to or greater than a first threshold.

6. The information security apparatus according to claim 5, further comprising:
an error determining unit configured to determine whether or not an error has occurred in the secret data outputted from said first tamper-resistant circuit by comparing the error-corrected secret data outputted from said error correcting unit and the secret data outputted from said first tamper-resistant circuit; and
a reset requesting unit configured to request said first tamper-resistant circuit to reset the predetermined secret data when said error-determining unit determines that the error has occurred,
wherein said first PUF circuit further includes a resetting unit configured to reset the predetermined secret data by causing said selecting unit to make the selection again when said first tamper-resistant circuit is requested to reset by said reset requesting unit.

7. The information security apparatus according to claim 6, wherein said first PUF circuit further includes:
a secret data storage unit for storing at least a part of the predetermined secret data;
a storage processing unit configured to store at least the part of the predetermined secret data in said secret data storage unit in a case where said selecting unit fails to select said M oscillation units so that the difference of the oscillation frequencies is equal to or greater than the first threshold during the selecting of said M oscillation units; and
an output controlling unit configured to, when said secret data storage unit stores at least the part of the predetermined secret data, (i) prevent said determining unit from determining the output value and (ii) output at least the part of the predetermined secret data stored in said secret data storage unit.

8. The information security apparatus according to claim 6, wherein said first tamper-resistant circuit includes:
a plurality of said first PUF circuits; and
a concatenating unit configured to generate secret data by concatenating output values outputted from said plurality of first PUF circuits,
wherein, when said error-determining unit determines that the error has occurred in the secret data outputted from said first tamper-resistant circuit, said error-determining unit is further configured to identify a first PUF circuit that outputs an output value including the error among said plurality of the first PUF circuits, and
wherein said reset requesting unit is configured to request said first PUF circuit identified as the PUF circuit outputting the output value having the error to reset the output value so that the output value indicates the part of the predetermined secret data.

9. The information security apparatus according to claim 5, further comprising:
an error-determining unit configured to determine whether or not an error has occurred in pre-error-correction secret data by comparing the error-corrected secret data and the pre-error-correction secret data, the error-corrected secret data being outputted from said error correcting unit and the pre-error-correction secret data being outputted from said first tamper-resistant circuit; and
a reset requesting unit configured to request said first tamper-resistant circuit to reset the predetermined secret data when said error determining unit determines that the error has occurred,
wherein said first PUF circuit further includes:
a secret data storage unit for storing at least a part of the predetermined secret data;
a storage processing unit configured to store at least a part of the predetermined secret data in said secret data storage unit when said first tamper-resistant circuit is requested to reset by said reset requesting unit; and
an output controlling unit configured to, when said secret data storage unit stores at least the part of the predetermined secret data, (i) prevent said determining unit from determining the output value and (ii) output at least the part of the predetermined secret data stored in said secret data storage unit.

10. The information security apparatus according to claim 5,
wherein said first PUF circuit further includes:
a difference determining unit configured to determine whether or not the difference of the frequencies between the oscillation signals outputted from said M oscillation units is smaller than a second threshold; and
a resetting unit configured to reset the predetermined secret data by causing said selecting unit to make the selection again when said difference determining unit determines that the difference of the frequencies between the oscillation signals is smaller than the second threshold.

11. The information security apparatus according to claim 10,
wherein said first PUF circuit further includes:
a threshold storage unit configured to store at least either of the first threshold and the second threshold; and
an updating unit configured to update at least either of the first threshold and the second threshold stored in said threshold storage unit.

12. The information security apparatus according to claim 5,
wherein said selecting unit includes:
a searching unit configured to search for said M oscillation units which output oscillation signals so that a difference of frequencies between the oscillation signals outputted from said M oscillation units is equal to or greater than the first threshold;
a parameter holding unit configured to hold a selectivity parameter that indicates said M oscillation units searched for by said searching unit; and
a selection determining unit configured to determine and select, as said M oscillation units to be selected, said M oscillation units indicated by the selectivity parameter held by said parameter holding unit.

13. An information security method for use in an information security apparatus that outputs preset secret data, said information security method comprising:
a first outputting in which a first tamper-resistant circuit is caused to output secret data, the first tamper-resistant circuit having tamper resistance and set, using physical characteristics, so as to output predetermined secret data;
a second outputting in which a correction data storage unit configured to store first correction data is caused to output the first correction data, the correction data storage unit being included in the information security apparatus;
a third outputting in which a second tamper-resistant circuit is caused to output second correction data, the second tamper-resistant circuit having tamper resistance and set, using physical characteristics, so as to output the second correction data;

generating error-correction information using the first correction data and the second correction data, the first correction data being outputted in said second outputting and the second correction data being outputted in said third outputting; and performing an error correction, using the error-correction information generated in said generating, on the secret data outputted by the first tamper-resistant circuit in said first outputting, and outputting the error-corrected secret data, wherein the predetermined secret data preset for the first tamper-resistant circuit and the second correction data preset for the second tamper-resistant circuit are set using a Physically Unclonable Function (PUF), wherein when ambient environment around the first tamper-resistant circuit and the second tamper-resistant circuit is changed, the first correction data stored in the correction data storage unit is generated based on (i) an output value outputted from the first tamper-resistant circuit and (ii) an output value outputted from the second tamper-resistant circuit, the output values being outputted from the first tamper-resistant circuit and the second tamper-resistant circuit which are in the ambient environment after being changed, wherein in said generating, the error-correction information is generated by coding the second correction data using a predetermined method and by XORing the coded second correction data and the first correction data.

14. A non-transitory computer-readable recording medium having stored thereon a computer program for outputting preset secret data, wherein, when executed by an information security apparatus, said computer program causes the information security apparatus to perform a method comprising:

a first outputting in which a first tamper-resistant circuit is caused to output secret data, the first tamper-resistant circuit having tamper resistance and set, using physical characteristics, so as to output predetermined secret data;

a second outputting in which a correction data storage unit configured to store first correction data is caused to output the first correction data, the correction data storage unit being included in the information security apparatus;

a third outputting in which a second tamper-resistant circuit is caused to output second correction data, the second tamper-resistant circuit having tamper resistance and set, using physical characteristics, so as to output the second correction data;

generating error-correction information using the first correction data and the second correction data, the first correction data being outputted in said second outputting and the second correction data being outputted in said third outputting; and performing an error correction, using the error-correction information generated in said generating, on the secret data outputted by the first tamper-resistant circuit in said first outputting, and outputting the error-corrected secret data, wherein the predetermined secret data preset for the first tamper-resistant circuit and the second correction data preset for the second tamper-resistant circuit are set using a Physically Unclonable Function (PUF), wherein when ambient environment around the first tamper-resistant circuit and the second tamper-resistant circuit is changed, the first correction data stored in the correction data storage unit is generated based on (i) an output value outputted from the first tamper-resistant circuit and (ii) an output value outputted from the second tamper-resistant circuit, the output values being outputted from the first tamper-resistant circuit and the second tamper-resistant circuit which are in the ambient environment after being changed, wherein in said generating, the error-correction information is generated by coding the second correction data using a predetermined method and by XORing the coded second correction data and the first correction data.

15. An integrated circuit for outputting preset secret data, said integrated circuit comprising:

a first tamper-resistant circuit having tamper resistance and set, using physical characteristics, so as to output predetermined secret data;

a correction data storage unit configured to store first correction data;

a second tamper-resistant circuit having tamper resistance and set, using physical characteristics, so as to output second correction data;

a correction information generating unit configured to generate error-correction information using the first correction data and the second correction data, the first correction data being stored in said correction data storage unit and the second correction data being outputted from said second tamper-resistant circuit; and an error correcting unit configured to perform an error correction, using the error-correction information generated by said correction information generating unit, on secret data outputted from said first tamper-resistant circuit, and to output the error-corrected secret data, wherein the predetermined secret data preset for said first tamper-resistant circuit and the second correction data preset for said second tamper-resistant circuit are set using a Physically Unclonable Function (PUF), wherein when ambient environment around said first tamper-resistant circuit and said second tamper-resistant circuit is changed, the first correction data stored in said correction data storage unit is generated based on (i) an output value outputted from said first tamper-resistant circuit and (ii) an output value outputted from said second tamper-resistant circuit, the output values being outputted from said first tamper-resistant circuit and said second tamper-resistant circuit which are in the ambient environment after being changed, wherein said correction information generating unit is configured to generate the error-correction information by coding the second correction data using a predetermined method and by XORing the coded second correction data and the first correction data.

* * * * *